(12) United States Patent
Cordell et al.

(10) Patent No.: US 8,028,445 B2
(45) Date of Patent: Oct. 4, 2011

(54) SUPPORTS AND SIGNS

(75) Inventors: Michael Cordell, Birmingham (GB); Richard Ivor Taffinder, Sutton Coldfield (GB)

(73) Assignee: Hills Numberplate Holdings Limited, Birmingham (GB)

( * ) Notice: Subject to any disclaimer, the term of this patent is extended or adjusted under 35 U.S.C. 154(b) by 720 days.

(21) Appl. No.: 11/993,533

(22) PCT Filed: Jun. 23, 2006

(86) PCT No.: PCT/GB2006/002316
§ 371 (c)(1), (2), (4) Date: Dec. 21, 2007

(87) PCT Pub. No.: WO2006/136847
PCT Pub. Date: Dec. 28, 2006

(65) Prior Publication Data
US 2009/0193694 A1    Aug. 6, 2009

(30) Foreign Application Priority Data

| Jun. 23, 2005 | (GB) | 0512782.4 |
| Jul. 20, 2005 | (GB) | 0514892.9 |
| Aug. 5, 2005 | (GB) | 0516133.6 |
| Dec. 1, 2005 | (GB) | 0524502.2 |
| Feb. 2, 2006 | (GB) | 0602078.8 |
| Apr. 5, 2006 | (GB) | 0606865.4 |

(51) Int. Cl.
*G09F 7/00* (2006.01)

(52) U.S. Cl. .................................................. 40/209

(58) Field of Classification Search .................. 40/200, 40/201, 202, 203, 209
See application file for complete search history.

(56) References Cited

U.S. PATENT DOCUMENTS

| 2,056,181 | A | * | 10/1936 | Fortinberry | 40/203 |
| 2,158,949 | A | * | 5/1939 | Sarles et al. | 182/91 |
| 2,258,754 | A | * | 10/1941 | Gill | 116/32 |
| 3,284,939 | A | * | 11/1966 | Perrot | 40/705 |
| 3,304,642 | A | | 2/1967 | Dardis | |
| 3,430,376 | A | * | 3/1969 | Fritz et al. | 40/209 |
| 3,912,405 | A | * | 10/1975 | Katt | 403/2 |
| 4,314,417 | A | * | 2/1982 | Cain | 40/209 |
| 5,621,571 | A | | 4/1997 | Bantli et al. | |
| 6,516,573 | B1 | * | 2/2003 | Farrell et al. | 52/98 |
| 6,628,209 | B1 | * | 9/2003 | Rother | 340/933 |
| 2004/0194653 | A1 | | 10/2004 | Taffinder | |
| 2005/0012616 | A1 | | 1/2005 | Forster et al. | |

FOREIGN PATENT DOCUMENTS

| CH | 688445 A5 | 9/1997 |
| DE | 9115021 U1 | 3/1992 |
| DE | 19527692 A1 | 2/1997 |
| DE | 20317551 U1 | 3/2004 |

(Continued)

*Primary Examiner* — Joanne Silbermann
*Assistant Examiner* — Shin Kim
(74) *Attorney, Agent, or Firm* — Caesar, Rivise, Bernstein, Cohen & Pokotilow, Ltd.

(57) ABSTRACT

A support assembly for attachment to a substrate, the assembly having a first part comprising a rebated surface to which a sign is securable and a second part having a peripheral wall sized and dimensioned to bound the first part and a continuous facing wall joined to or contiguous with said peripheral wall, the two parts being securable together whereby said continuous facing wall overlies at least part of a peripheral portion of the rebated surface of said first part.

38 Claims, 22 Drawing Sheets

FOREIGN PATENT DOCUMENTS

| | | |
|---|---|---|
| EP | 0457544 A1 | 11/1991 |
| EP | 1316434 A2 | 6/2003 |
| EP | 1512583 A1 | 3/2005 |
| EP | 1516790 A1 | 3/2005 |
| GB | 2376437 A | 12/2002 |
| GB | 2417596 A | 3/2006 |
| WO | 00/13938 A2 | 3/2000 |
| WO | 00/21059 A2 | 4/2000 |
| WO | 02/14110 A1 | 2/2002 |
| WO | 02/102626 A1 | 12/2002 |

* cited by examiner

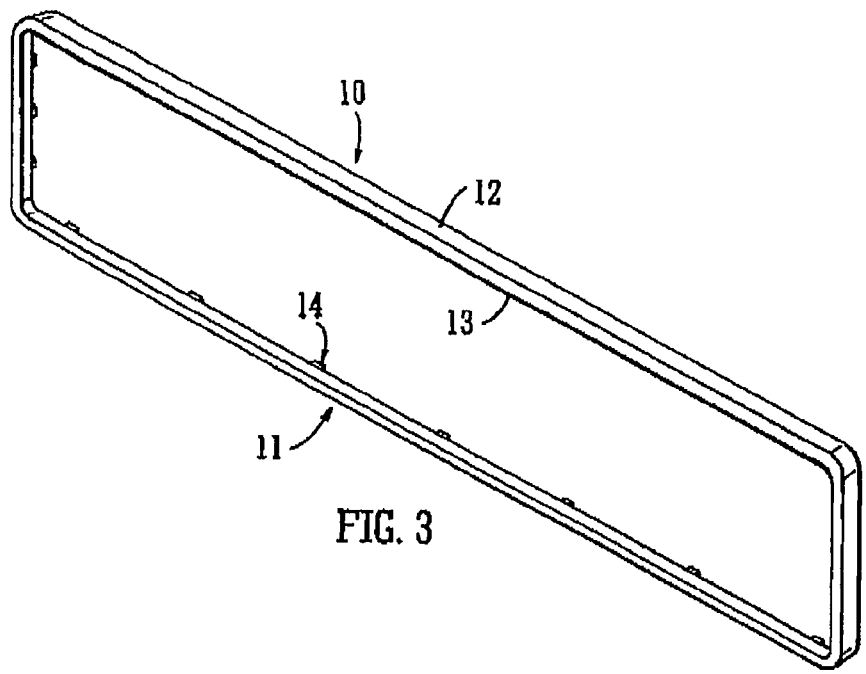
FIG. 3
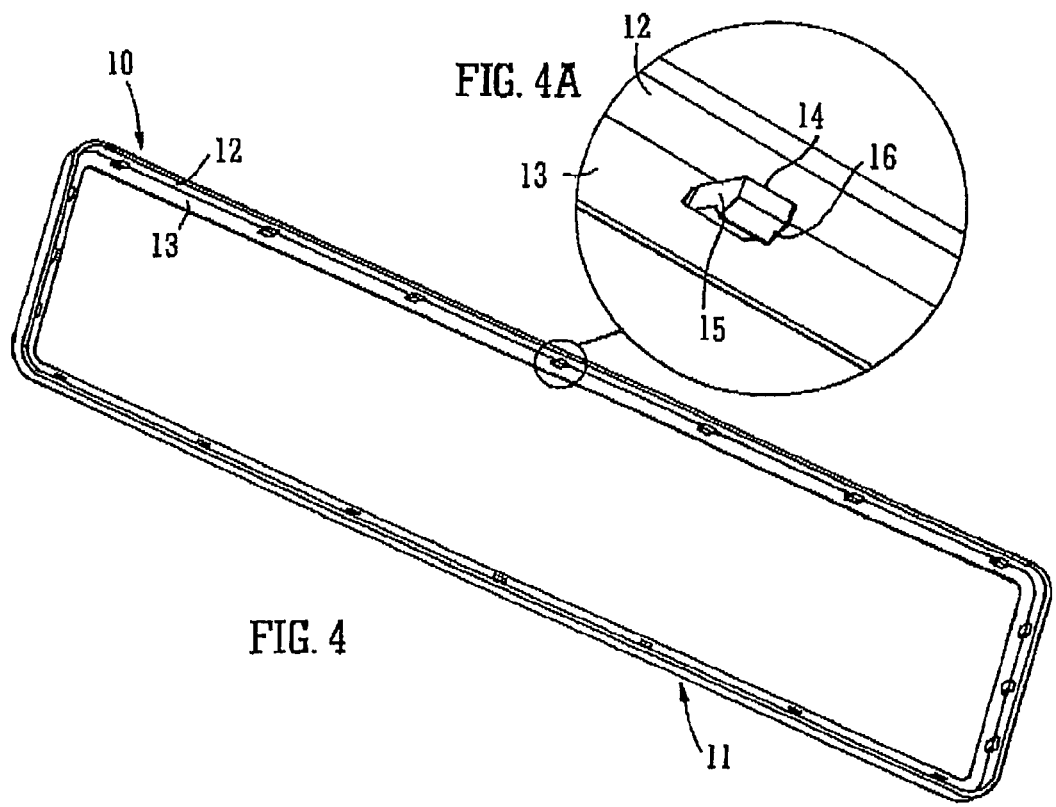
FIG. 4A
FIG. 4

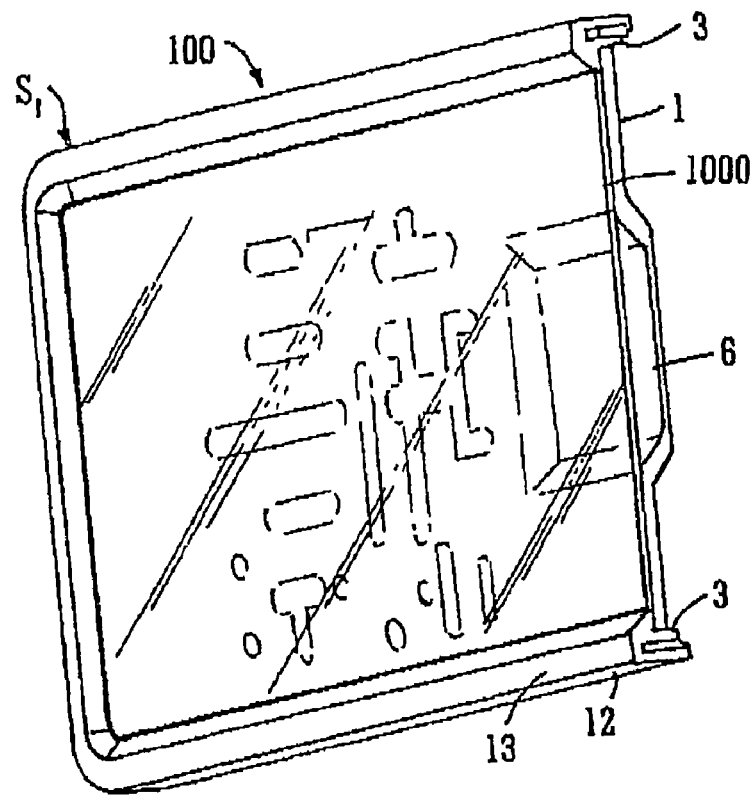
FIG. 5
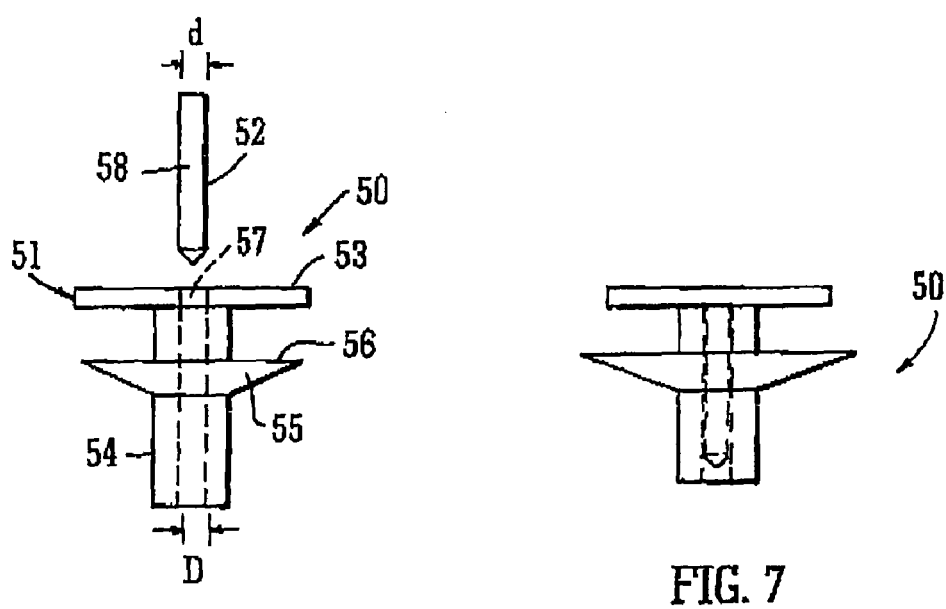
FIG. 6
FIG. 7

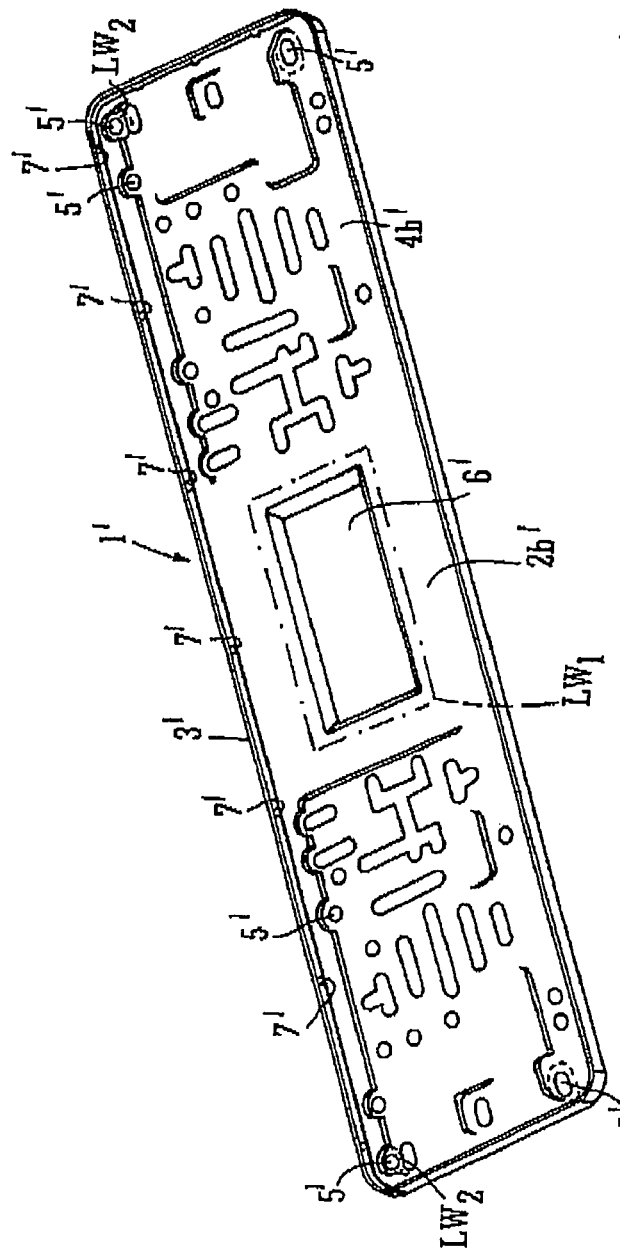
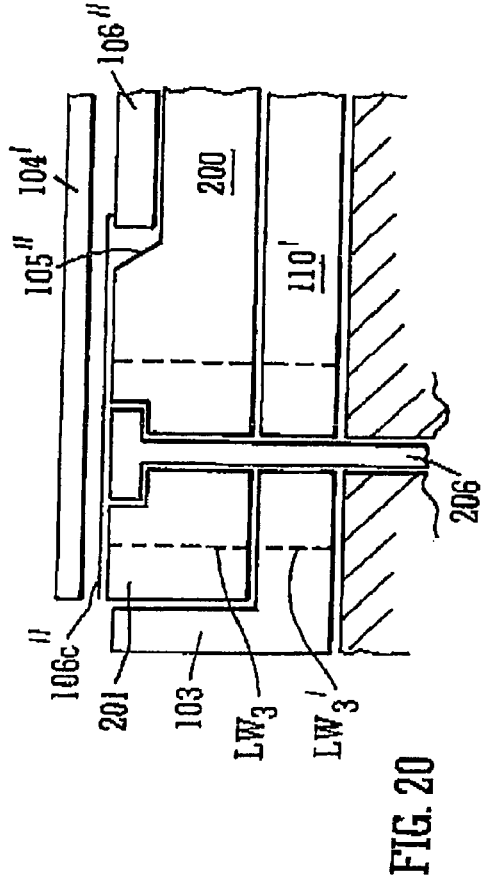
FIG. 19
FIG. 20

SUPPORTS AND SIGNS

BACKGROUND OF THE INVENTION

This invention relates to supports, particularly supports for identification plates suitable for use on vehicles, and to signs e.g. identification devices, such as identification plates suitable for use on vehicles.

It is known that numberplates for motor vehicles are stolen. This may be done to. 'clone' a car for use in the pursuit of crime or to avoid paying city congestion charges, for example.

Accordingly, it is desired to provide means such as a support usable with an identification device, for example a vehicle numberplate, which has measures to prevent its theft and/or which is readily identified or identifiable as having been stolen.

Moreover, it is desirable to be able to identify the nature and/or provenance of an article remotely.

In the field of motor vehicle licence plates, solutions have been proposed which enable a person to remotely obtain information concerning the vehicle to which the plate is attached and/or other information pertaining to the driver (e.g. insurance details) and so on.

These passive tags comprise a microwave antenna which is necessarily large to receive an interrogation signal and to receive enough power to activate the circuitry. The large antenna ensures that it may be impossible or at least difficult to form/emboss such a plate.

U.S. Pat. No. 5,621,571 discloses an integrated retro-reflective electronic display comprising a substrate, a ground plane, a dielectric substrate, an antenna network comprising a pair of micro switch patch antennas, and a retro-reflective layer which bears indicia. Conventional retro-reflective layers incorporate a metal layer to retro-reflect light. In this patent, the retro-reflective layer incorporates a disparate metal layer which has enough 'free space' to allow the passage of radio frequency signals (at 915 MHz). Other retro-reflective materials which do not comprise a metal layer are also disclosed. The antenna network is fed via a coaxial connector mounted at the rear of the display through which the network may be connected to any outboard electronic module (for example a power source, memory device, power source and so on).

It is also desired to provide solutions to the theft and/or unwanted removal problem which can ensure that any sign so-removed is unusable thereafter.

In our previously filed International (PCT) patent application PCT/GB02/02773 (published as WO 02/102626 A1) we disclose and claim an identification plate comprising a supporting substrate having a retro-reflective major surface and a transparent sheet material having indicia printed thereon, the transparent sheet material being adhered to the retro-reflective major surface such that the indicia are located in contact with, or at least adjacent to, the retro-reflective major surface, and wherein one or more lines of weakness may be formed in the substrate.

The plate is to be adhered to a surface (for example a body of a car) using sticky pads which would be located either side of the or each line of weakness. If a thief or vandal attempts to remove the plate from the surface to which it is adhered, the plate will snap about the line of weakness. The snapping of the plate causes the transparent sheet to become stretched and/or delaminated from the substrate which makes the plate unsightly and provides an obvious visual indication that the plate has been removed from a surface.

It is an object of the present invention to provide a support which increases the security afforded to identification plates, in particular, although not exclusively for use with signs, e.g. identification plates, provided with lines or areas of weakness.

It is a further object of the invention to provide signs which comprise tamper evident means to indicate, for example, unauthorised or unwanted removal.

BRIEF SUMMARY OF THE INVENTION

Accordingly, a first aspect of the invention provides a support assembly for attachment to a substrate, the assembly having a first part comprising a rebated surface to which an identification plate is securable and a second part having a peripheral wall sized and dimensioned to bound the first part and a continuous facing wail joined to or contiguous with said peripheral wall, the two parts being securable together whereby said continuous facing wall overlies at least part of a peripheral portion of the rebated surface of said first part.

A second aspect of the invention provides a combination of an identification plate and a support assembly, the assembly having a first part comprising a rebated surface to which an identification plate is securable and a second part having a peripheral wall sized and dimensioned to bound the first part and a continuous facing wall joined to or contiguous with said peripheral wall, the two parts being securable together whereby said continuous facing wall overlies at least part of a peripheral portion of the rebated surface of said first part, the plate being retained within the assembly whereby access to the edge of the plate is prevented or inhibited.

The first and second parts are preferably permanently secured or securable together. In this specification the term 'permanent', 'permanently' or similar is intended to mean that the two parts are releasable from one another by breaking at least a portion of one or other of the two parts.

Preferably, the plate is secured or securable to the rebated surface of the first part, for example using adhesion means.

One of the first and second parts may comprise one or more spigots, preferably hooked spigots, which are engageable with a part (for example corresponding apertures) in the other of the first and second parts to provide mutually co-operable means.

In a preferred embodiment, the spigots and apertures provide a snap-fit engagement.

Preferably, the spigots depend from a facing surface of said facing wall of the second part and they are engageable with, or engage, corresponding apertures provided in the periphery of the first part.

Additionally or alternatively one or both of the first and second parts may comprise one or more rebates, or other areas, for the location of adhesion means.

Preferably, the first part comprises at least one upstanding wall, preferably to at least partially define the rebated surface for location of the plate. The, each or at least some of the upstanding walls may be arranged to restrict access to said adhesion means and/or to the major surface of the plate facing said first part. The upstanding wall may be continuous or interrupted.

The or each upstanding wall may have the apertures disposed therein and/or thereabout.

The support may comprise antenna means. Additionally or alternatively, the support may comprise means for the location of antenna means.

Said antenna means may comprise a loop antenna arranged to extend at least partially around the periphery of the first or second part. A patch antenna may be used.

Preferably, said antenna means is located in the second part.

Preferably, said antenna means is moulded in the first or second part.

The support may also comprise separable portions, (for example defined by one or more lines of weakness to provide frangible portions). Preferably the support comprises one or more fixing areas through which fixing means are extendable or to which fixing means may be secured for securing said support to a site-of-use, wherein the or at least one of said fixing areas is defined by one or more lines of weakness to provide one or more frangible portions.

The support may comprise an electronic module.

Said fixing means may comprise one or more of adhesive means, screw means, bolt means and so on.

Preferred said fixing means comprise one or more expanding fittings which preferably have a head, the or each fitting may extend through a corresponding feting area. Additionally, or alternatively, the, or each, fitting may extend through a plate frangible area. If present, the head may bear against the support or the plate, in either or both cases the head may be locatable in a rebate provided in the support or plate. A washer may also be used.

Additionally, or alternatively, the plate, and in particular, although not exclusively, a separable portion of the plate (e.g. a frangible portion), may be secured to the support, for example to the, some or each support frangible portion, using fixing means, such as mechanical or adhesion means.

In a most preferred embodiment, the support is secured to a site-of-use using expanding fittings which extend through the fixing areas thereof, a plate is then adhered to the support such that frangible portions of the plate are secured to the fixing areas. In this way, if a person attempts to pry the support from a site of use the fixing areas will break from the support and so will the plate frangible areas break from the plate thereby rendering the plate useless or at least readily identifiable as having been tampered with.

Preferably, the plate may be formed with one or more frangible portions. The or each frangible portion is preferably arranged to fracture or break in the event of an attempt to separate the or a plate from the surface of the support of the first part.

Preferably, said adhesion means comprises an adhesive applicable, applied or laminated to a major surface of either one or both of said first part of the support or the plate, say over an entire major surface of one or both. Alternatively, said adhesion means may comprise foam pads bearing adhesive on major surfaces thereof.

In one embodiment, said adhesion means comprises first adhesion means, e.g. one or more first pads or adhesive, providing a relatively low level of adhesion between the surface and the facing surface of the plate and second adhesion means, e.g. one or more second pads or adhesive, providing a relatively high level of adhesion between the surface and the facing surface of the plate, e.g. the adhesive on the second pad or pads or adhesive is arranged to provide a stronger bond between surface and facing surface of the plate than that of the first pad or pads or adhesive.

Preferably, the facing surface of the plate is delimited by lines of weakness into two or more areas. In one embodiment, the first adhesion means and second adhesion means will provide adhesion between the surface of the support and different areas of the facing surface of the plate.

The first part may comprise apertures, through which, using mounting or fixing means, the support is mountable to a substrate.

Alternatively, the first part may comprise recesses to provide indications for insertion of mounting means to support the assembly on a substrate.

Preferably, the plate will comprise a substrate to which a retro-reflective or other sheet material is secured.

The substrate may be a backing plate or a transparent front plate, the backing plate may be made from plastics or metal materials.

In the case of a transparent front plate, indicia may be applied to the front plate, in reverse, and the retro-reflective or other sheet material laminated thereto to sandwich the indicia there-between. Alternatively, the indicia may be applied to the retro-reflective or other sheet material.

The retro-reflective or other sheet material will preferably comprise the plate frangible portion such that the retro-reflective or other sheet material adhered or secured to the support, for example the support frangible portions, will delaminate from the plate during a removal event.

In a further embodiment, the sheet material will be laminated to a plastics or metal backing plate and the plate will comprise the, some, or each frangible portion such that during a removal event the frangible portions will break which will cause de-lamination of the retro-reflective or other sheet material in that region or will at least cause local stretching to ensure that it is evident that there has been a removal event.

The retro-reflective or other sheet material may also comprise frangible portions.

The retro-reflective or other sheet material may have a transparent layer applied thereto. (indicia may be applied to the retro-reflective or other sheet material, or to the transparent layer (e.g. in reverse—see WO 02/102626).

The indicia may be applied by printing, adhering, embossing, or otherwise marking.

In another embodiment, the plate may comprise a retro-reflective sheet material, with or without a transparent front layer, secured to the support.

Where the plate comprises an on-board electronic module, may be at least partially located within the or at least one frangible portion.

Additionally or alternatively, where the plate comprises an electronic module and connection means for connection to an outboard antenna means, connection means may be secured to a frangible portion of the plate so that, subsequent to a removal event, said connection means is broken or otherwise damaged.

A further aspect of the invention provides an identification sign comprising a substrate having a substantially planar major surface and an electronic module located in or on the substrate, the substrate further comprising one or more lines of weakness to define a frangible area in or on which the module is located.

The sign may have connection means for connection to an outboard antenna means. Alternatively, the sign may comprise on board antenna means.

There is also provided in another aspect of the invention, an identification sign comprising a substrate having a substantially planar major surface and an electronic module located in or on the substrate, connection means to connect the module to outboard antenna means and further comprising one or more lines of weakness to define at least one frangible portion, said connection means being secured across one or more of the lines of weakness.

The outboard antenna means may be located in a support for the sign or plate or at another remote location. Alternatively, said antenna means may be secured to the sign or plate or may lie, at least in part, adjacent the sign or plate. The antenna means may be connected physically, e.g. joined, to said connection means. Operable connection between said connection means may require physical or non physical (e.g. Inductive) connection.

A yet further aspect of the invention provides an identification plate, the plate comprising transparent plastic panel having a first and second major face, a reflective or retroreflective material being adhered or otherwise connected to a first major face of the panel and a transparent sheet adhered or otherwise connected to the second major face and indicia provided between the transparent sheet and the second major face of the panel.

Preferably the panel is from 1.0 to 2.0 mm thick, most preferably 1.2 to 1.8 mm thick and in particular 1.5 mm thick.

The panel may be formed of acrylic. The panel may be rigid in so far as it is self supporting.

The reflective or retroreflective material may be any commercially available retroreflective sheet material such as those supplied by 3M Corporation of St. Paul's Minn., USA, or Nippon Carbide industries Incorporated of Santa Fe Springs, Calif., USA. Advantageously, the retroreflective material is sheet material, which has discontinuities in its structure, such as frangible portions.

Alternatively, or additionally, the adhesive which may be used to connect the reflective or retroreflective sheet material to the first major surface may be applied discontinuously or unevenly such that some parts of the reflective or retroreflective material may be adhered to the first major surface more strongly than other parts.

Alternatively, in place of or as well as the discontinuities, the reflective or retroreflective sheet material may comprise a reflective layer which is not provided with a backing layer and/or top layer so that when the sheet material is removed from a substrate to which it is secured (e.g. adhered) the reflective or retroreflective will rip, tear or become otherwise visibly damaged. A suitable example of such a reflective sheet material is sold by 3M under the designation 5000 or 7000 series.

The transparent sheet is preferably a plastics or polymeric material such as polyvinylchloride, PMMA, polyester, polypropylene.

The transparent sheet material has two major faces, one to which the indicia will lie adjacent and a second to which an opaque release liner may be releasably secured.

The opaque release liner may be formed of plastics polymeric material, or paper. Preferably one of the release liner and the second major surface may carry a pressure sensitive adhesive and the other a silicone release layer.

The indicia may be applied to one or both of the second major face of the panel and the transparent sheet material, more preferably to the transparent sheet material.

The indicia may be applied by any suitable printing means, but preferred are laser printers and thermal printers, although ink jet and other printers may also be used. The indicia may be applied by hand as transfers or other indicia.

The plate may be securable to a substrate by fixings which extend through apertures in the plate. The plate may further comprise separable portions, such as frangible portions, which may, for example, surround the through holes to define fixing areas.

A further aspect of the invention provides an identification plate, the plate comprising a rigid transparent plastics panel having a first and second major face and a reflective or retro-reflective sheet material, indicia being provided between the plastics panel and the reflective or retro-reflective sheet material on a transparent plastics sheet material being located between the panel and the retroreflective sheet material, the reflective or retro-reflective sheet material having discontinuities to provide a plurality of portions which are separable from one another.

In a first embodiment the reflective or retro-reflective sheet material comprises frangible portions, in another embodiment the reflective or retro-reflective sheet material is cut through (e.g. die cut) to provide a plurality of distinct portions, in a further embodiment the reflective or retro-reflective sheet material is provided as two or more distinct portions. Combinations of the above embodiments may be provided.

The indicia may be provided on one or both of the reflective or retro-reflective sheet material or the transparent plastics panel. The or further indicia may be provided on one or both major faces of the transparent sheet material if present.

Another aspect of the invention provides an identification plate, the plate comprising transparent plastic panel having a first and second major face, a transparent sheet material having a first and a second major face, one of the first and second major face of the transparent sheet material being adhered or otherwise connected to the second major face of the panel and a reflective or retro-reflective sheet material being adhered or otherwise connected to the other major face of the transparent sheet material, and indicia located between the transparent panel and the reflective or retro-reflective sheet material.

Preferably, at least one of said first and second major face of the transparent sheet material or the reflective or retroreflective sheet material bearing indicia.

The transparent sheet material and reflective or retro-reflective sheet material are preferably provided in a plurality of portions, for example by die cutting through the thickness thereof.

Preferably the transparent plastic panel is from 1.0 to 4.0 mm thick, for example 3.5 mm thick, although in other embodiments the panel may be from 1.2 to 1.8 mm thick and, in particular, 1.5 mm thick.

The panel may be formed of acrylic, and is preferably rigid.

The transparent sheet material is preferably a plastics, polymeric material, for example it may be selected from polyester (PE), polyvinyl chloride (PVC), polymethylmethacrylate (PMMA) or other known transparent polymer sheet materials.

The reflective or retro-reflective sheet material may be any commercially available retro-reflective sheet material such as those supplied by 3M Corporation of St. Paul's Minn., USA, or Nippon Carbide Industries Incorporated of Santa Fe Springs, Calif., USA.

In this specification "sheet material" is intended to mean a material which is flexible and which may be available on rolls of material, which may be delimited, for example shaped, into a plurality of plate-sized lengths, or as individual lengths which are plate-sized.

The indicia will preferably provided on one or both of the facing surfaces of the transparent sheet material or reflective or retro-reflective sheet material. In a preferred embodiment at least some of the indicia are provided on the major face of the transparent sheet material to which the reflective or retro-reflective sheet material is adhered, in which case the indicia will be reverse printed thereonto.

Printing onto any or all surfaces will preferably be completed by a laser, ink jet or thermal transfer printer. The indicia may be applied by hand or machine as transfers or other indicia.

When printing to the reflective or retro-reflective sheet material and/or the transparent sheet material, and to facilitate the same, an opaque release liner may be releasably secured to that face which is not to be printed to.

The opaque release liner may be formed of plastics polymeric material, or paper. Preferably one of the release liner and the second major surface may carry a pressure sensitive adhesive and the other a silicone release layer.

A further aspect of the invention provides a method of securing an identification plate to a surface, the method comprising securing a first part of a support assembly to the surface and locating a plate on said first part, locating a second part of the assembly over and around the first, the second part having a facing wall to overlie the periphery of at least part of the plate to prevent or inhibit access between the first part and the facing surface of the plate located thereon.

A yet further aspect of the invention provides a support for use with a sign, the support having a surface to which a sign is securable or secured and fixing points to engage with fixing means to secure the support to a site-of-use, the support comprising antenna means.

A yet further aspect of the invention provides a support for use with a sign, the support having a surface to which a sign is securable or secured and fixing points to engage with fixing means to secure the support to a site-of-use, the support comprising lines of weakness.

The support may comprise a second part arranged to at least partially co-operate with the surface to retain, in use, a sign therebetween.

A further aspect provides a combination of a sign and a support for use with the sign, the support having a surface to which the sign is securable or secured and fixing points to engage with fixing means to secure the support to a site-of-use, the support comprising lines of weakness.

Preferably, the sign comprises one or more lines of weakness to define one or more frangible portions. The sign may be secured to the support using adhesives.

The support may comprise one or more frangible portions.

DETAILED DESCRIPTION OF THE INVENTION AND BRIEF DESCRIPTION OF SEVERAL VIEWS OF THE DRAWINGS

In order that the invention may be fully understood, it will now be described, by way of example only, and with reference to the accompanying drawings, in which:

FIG. 3 is an isometric view of the front of a second part of the first embodiment of an assembly of the invention;

FIG. 4 is an isometric view of the rear of the part of FIG. 3;

FIG. 4A is a detailed view of part of FIG. 4; and

FIG. 5 is an isometric sectional view of the assembly of the first embodiment of the invention.

Figure 1:
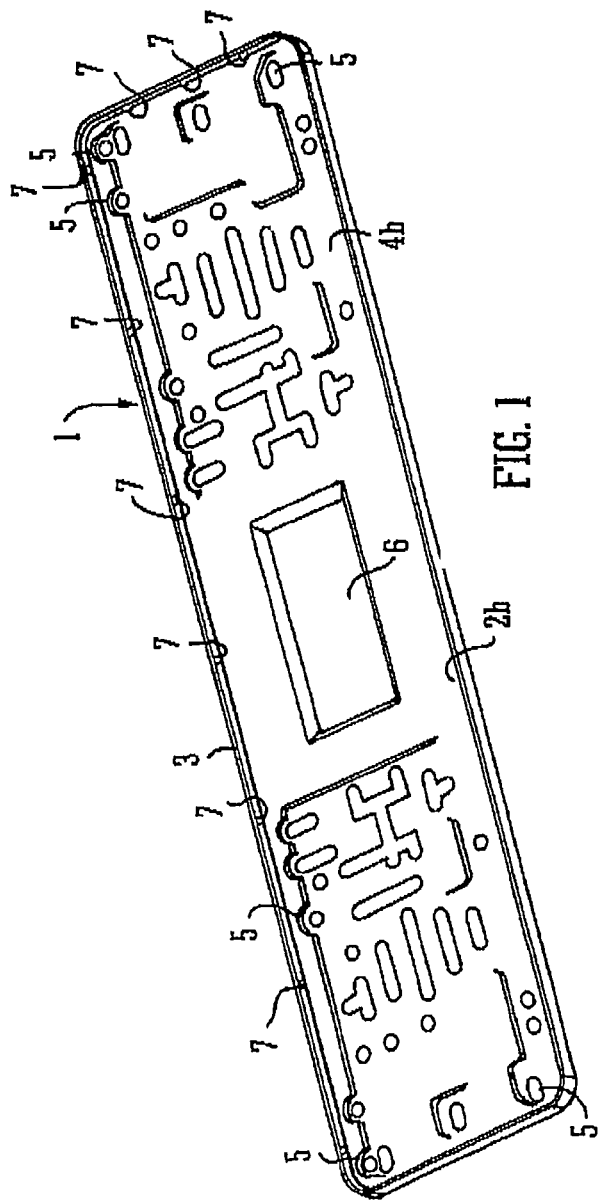
FIG. 1 is an isometric view of the front of a first part of a first embodiment of an assembly of the invention.
Figure 2:
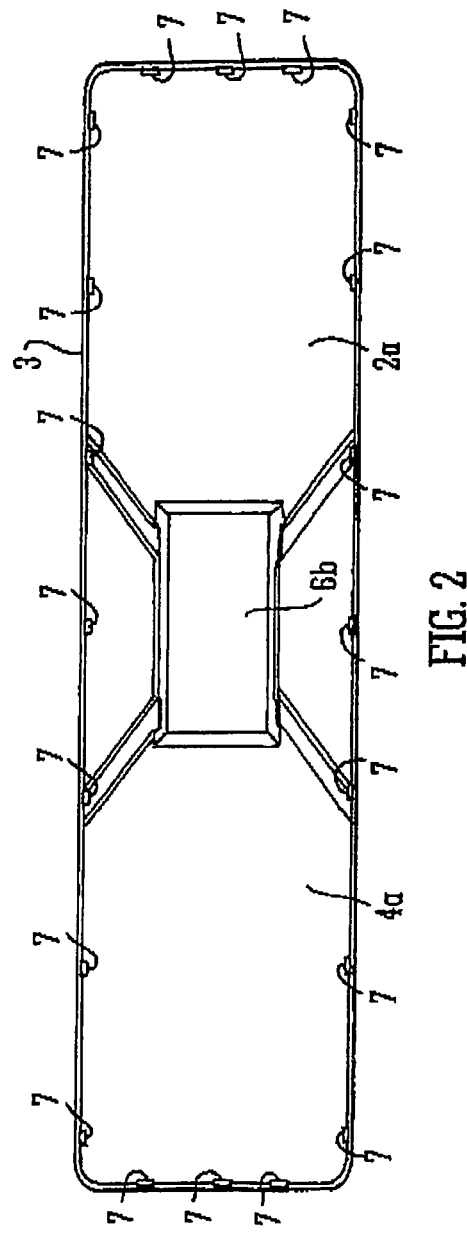
FIG. 2 is an isometric view of the rear of the part of FIG. 1.

Referring to FIGS. 1 and 2, there is shown a backing plate or first part 1 of a support 5 which is substantially flat and has first and second surfaces 2a, 2b which are bounded by a peripheral wall 3. The first surface 2a is intended to lie adjacent a substrate (not shown) to which the backing plate 1 is secured.

The peripheral wall 3 stands proud of both the first and second surfaces 2a, 2b to provide recessed areas 4a, 4b respectively.

The upper surface 2b is provided with a plurality of sunk rebates 5 in which the heads of screws or other fixing means (not shown) can be retained, as will be explained below, and a large rebate 6 to locate a corresponding protrusion formed on a sign to be retained, again as explained below.

The peripheral wall 3 upstands from the second surface 2b to the extent that a sign (see FIG. 5) is locatable in the area 4b without standing proud of the wall 3.

On the other side, the peripheral wall 3 extends beyond the surface 2a to ensure that a protuberance 6b corresponding to rebate 6 does not extend in a direction perpendicular to the plane of surface 2a, beyond the wall 3.

Located around the plate 1, adjacent the peripheral wall 3 are a plurality of apertures 7, the purpose of which will be described below.

Referring now to FIGS. 3, 4 and 4A, there is shown a second part 10 of the support 5, which is a substantially rectangular frame 11 defined by a first wall 12 from which a further wall 13 extends inwardly and at substantial right angles to the first wall 12.

Depending from the further wall 13, at various points along the length thereof are catch members 14 having a spigot 15 from which a catch 16 extends, to provide an abstract surface aligned in a direction substantially perpendicular to the first wall 12.

In use, the first part 1 of the assembly 100 (see FIG. 5) will be secured to a substrate (not shown) using suitable fasteners such as screws, nuts and bolts or the fasteners described below. Holes will be formed or drilled in the region of the sunk rebates 5 to allow the fastener, for example the shank of the fastener, to pass therethrough, the depth of the rebate being such to ensure that the head of the fastener does not extend into the recessed area 4b.

A sign, such as a vehicle identification plate 1000 is then located in the area 4b and secured to the surface 2b of the backing plate 1 using an adhesive. Typically, the adhesive will be laminated to the surface of the identification plate 1000 which is to face the backing plate 1 and will often be protected by a release liner which will be removed prior to the application of the plate 1000 to the surface 2b of the backing plate 1.

Because the heads of the fasteners are located in rebates 5, the facing surface of the plate 102 is able to be brought into intimate contact with the majority of the surface 2b to effect strong adhesion therebetween. Also, the provision of the rebate 6 allows the accommodation of a corresponding protuberance on the plate 102. Because the plate 1000 is located in area 4b from which it does not substantially protrude, access to the underside of the plate 102 is restricted by the peripheral wall 3.

The second part 10 is then fitted over the first part 1, with the catch members 14 aligned with the apertures 7. The second part 10 is then pushed towards the first part 1. The first wall 12 of the second part 10 bounds the peripheral wall 3 of the first part 1. Continued pushing causes the catch 16 of the catch members 14 to snap-fit into engagement with surface 2a of the first part 1, thereby securing the second part 10 to the first 1 and retaining the plate 1000 therebetween.

The inwardly extending further wall 13 overlies the periphery of the sign, e.g. the vehicle identification plate 1000 to deny or inhibit access to the edge thereof.

The nature and number of catch members 14 and apertures 7 are such that the second part 10 is extremely firmly held to the first part 1.

Therefore, to gain access to the retained sign, e.g. number plate 1000, it is necessary to break one or both of the first 1 and second 10 parts of the assembly 100.

It is preferred that the material of manufacture of the vehicle plate 1000 is thin, a suitable material being 0.8 mm thick aluminium. If such a material is used, any attempt to break the inwardly facing wall 13 of the second part 10 by inserting a, for example, screw driver or crow bar under the wall 13, will inevitably result in the number plate 1000 becoming damaged. Even if the first part 10 is broken sufficiently to gain access to the edge of the plate 1000 the peripheral wall 3 of the first part 1 will need to be broken to provide an access point to the underside of the plate 1000.

Other sign or plate 1000 constructions may be used, as will be explained below.

Typically, the sign or plate 1000 will be scored or will have other lines of weakness provided therein so that if a person were to attempt to prise the plate 1000 from the first part 1 (to which it is adhered) the plate 1000 will break about or on the lines of weakness.

In some embodiments the peripheral wall 3 may be discontinuous to encourage a person to attempt to prise away the plate 102 in a particular position, for example to encourage an attack to occur next to a particular line of weakness to ensure that the plate 1000 breaks during such an effort.

It is envisaged that at least some of the catch members 14 and corresponding apertures 7 could be augmented, substituted or replaced by other securing means. For example, an adhesive may be used. Rebates in facing or adjacent parts of the two parts may be provided to locate an adhesive. The catch members 14 may extend from the edge of wall 12 to clip over the edge of the first part 1. In place of some or all of the apertures 7 in the first part 1, the wall 3 may have a number of rebates formed therein, disposed about the periphery thereof. In which case catch members 14 may be located adjacent, or on, the first wall 12. In this way the catch members 14 are hidden once the two parts 1, 10 have been engaged and the formation of the first part 1, say by moulding, is made easier.

Clearly, once the assembly 100 has been formed it is very difficult to gain access to the plate 1000 and even more difficult to remove the plate 1000 without causing damage which would render the plate unusable or, at least, would make it evident that the plate 1000 had been removed from a proper location.

A further point of attack is to attempt to remove the assembly 100 whole, i.e. with the plate 1000 retained therein.

Depending on the fasteners used, an attempt to remove the assembly 100 from, say, a car will preferably cause substantial damage to the vehicle.

A particularly suitable fastener for this purpose is shown in FIGS. 6 and 7 which are sectional views through a fastener according to a further aspect of the invention.

Referring to FIG. 6, there is shown a two part fastener 50 having a main part 51 and a second part or insert 52. The main part 51 has a head 53, which is relatively large and flat, to which is joined a shank 54. The shank 64 is formed with an annular flange 55 intermediate its ends, the flange 55 being provided, as shown, with a flat upper abutment surface 56. The shank 54 is provided with a bore 57 having a first transverse dimension D. The second part 52 is in the form of an elongate rod 58 having a pointed end 59. The rod 58 has a transverse dimension d which is marginally larger than that D of the bore 57.

When the rod 58 is forced into the bore 57 the flange 55 is caused to expand thereby increasing the size of the abutment surface 56, as shown in exaggerated form in FIG. 7.

In use the shank 54 is inserted into an aperture such that the head 53 lies adjacent a first part to be joined and the flange 56 lies adjacent a second part to be joined. The insert 52 is then forced into the bore 57 causing the abutment surface 56 to increase and drawing the head 53 and flange 55 clear together.

The head 53 and shank 54 may be formed in one piece or may be, for example screwed together.

The bore 57 may be tapped, as may the outer surface of the rod 58, in which case D and d will be such as to allow the parts 51, 52 to be screwed together, which engagement can cause the flange 56 to expand, as shown in FIG. 7. In this case the second part 52 may have a head for engagement with a tool.

In any case, the fastener 50 may be used with the assembly 100 previously disclosed.

The assembly 100, using the fasteners 50 disclosed above or other such as clutch head posidrive or one way fixings may be located on a vehicle or other desired location. If necessary (for example, if the desired site of location is weak or at least not of the required strength) then a reinforced backing member (e.g. a metal plate) may be used on the reverse side of the substrate (i.e. the desired location) for the fastener to bear against.

The assembly 100 may be fabricated from plastics material, for example polyester, ABS or a composite material such as GRP. In most cases it is preferred to use a thermosetting resin.

Figure 8:
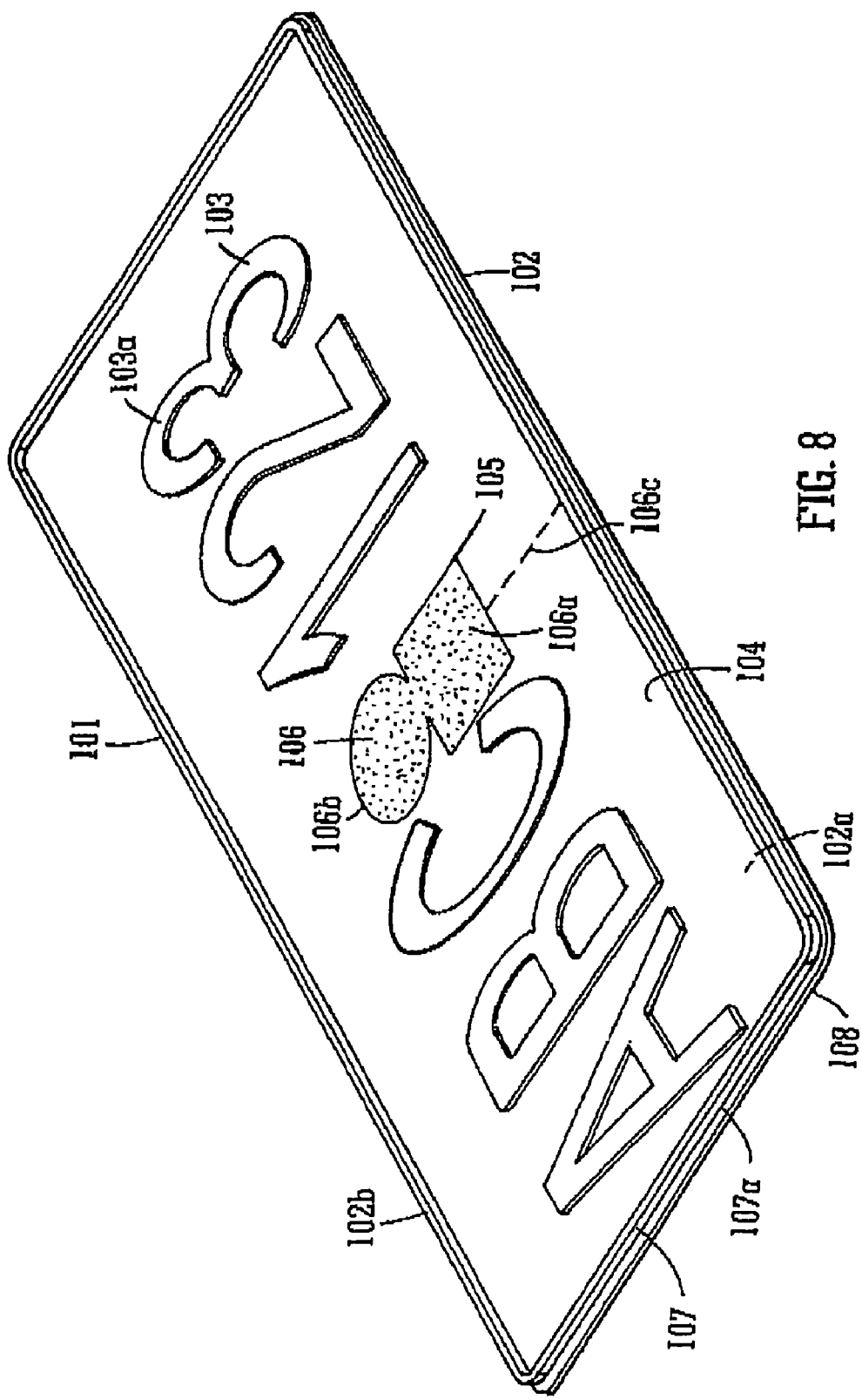
Figure 9:
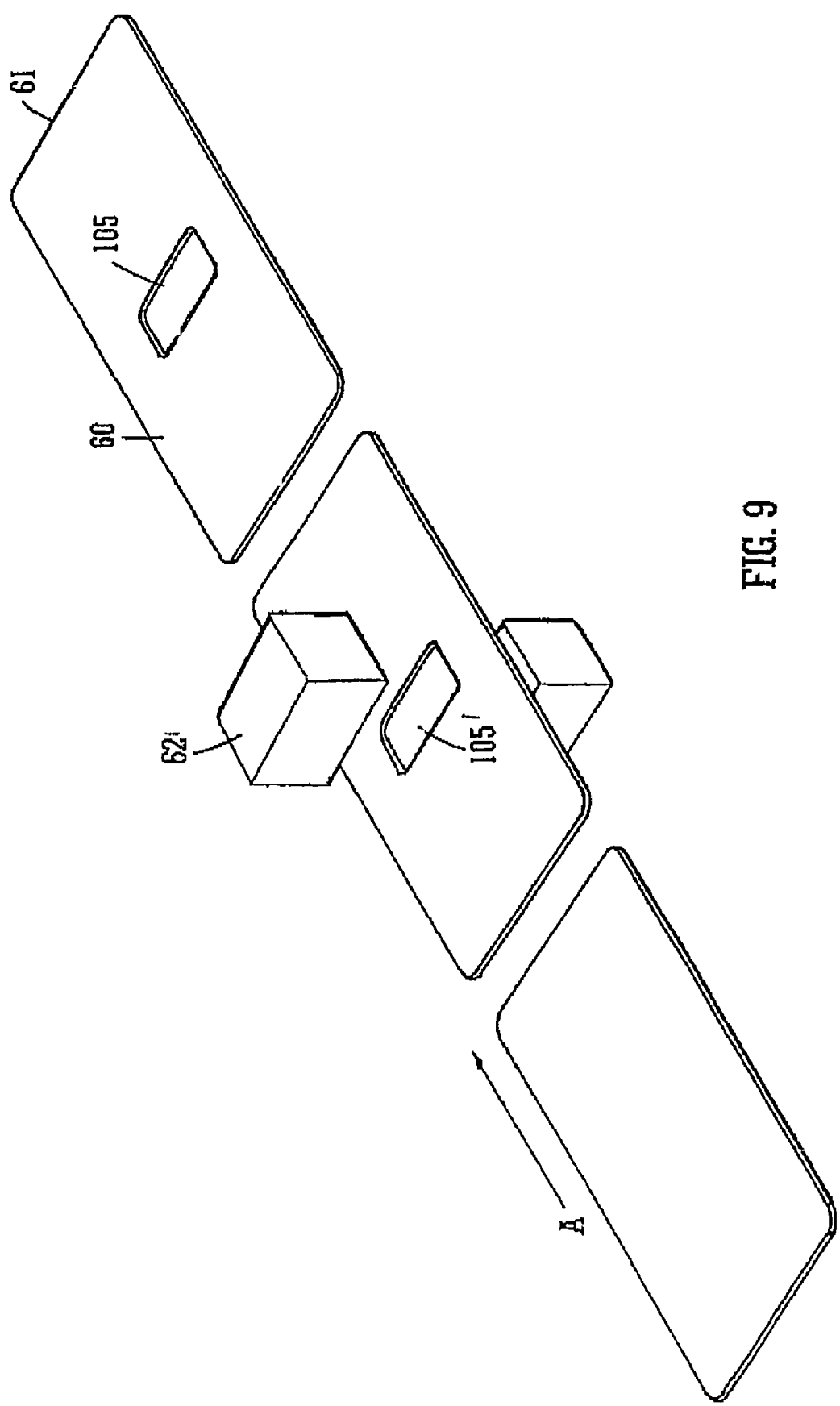
Figure 10:
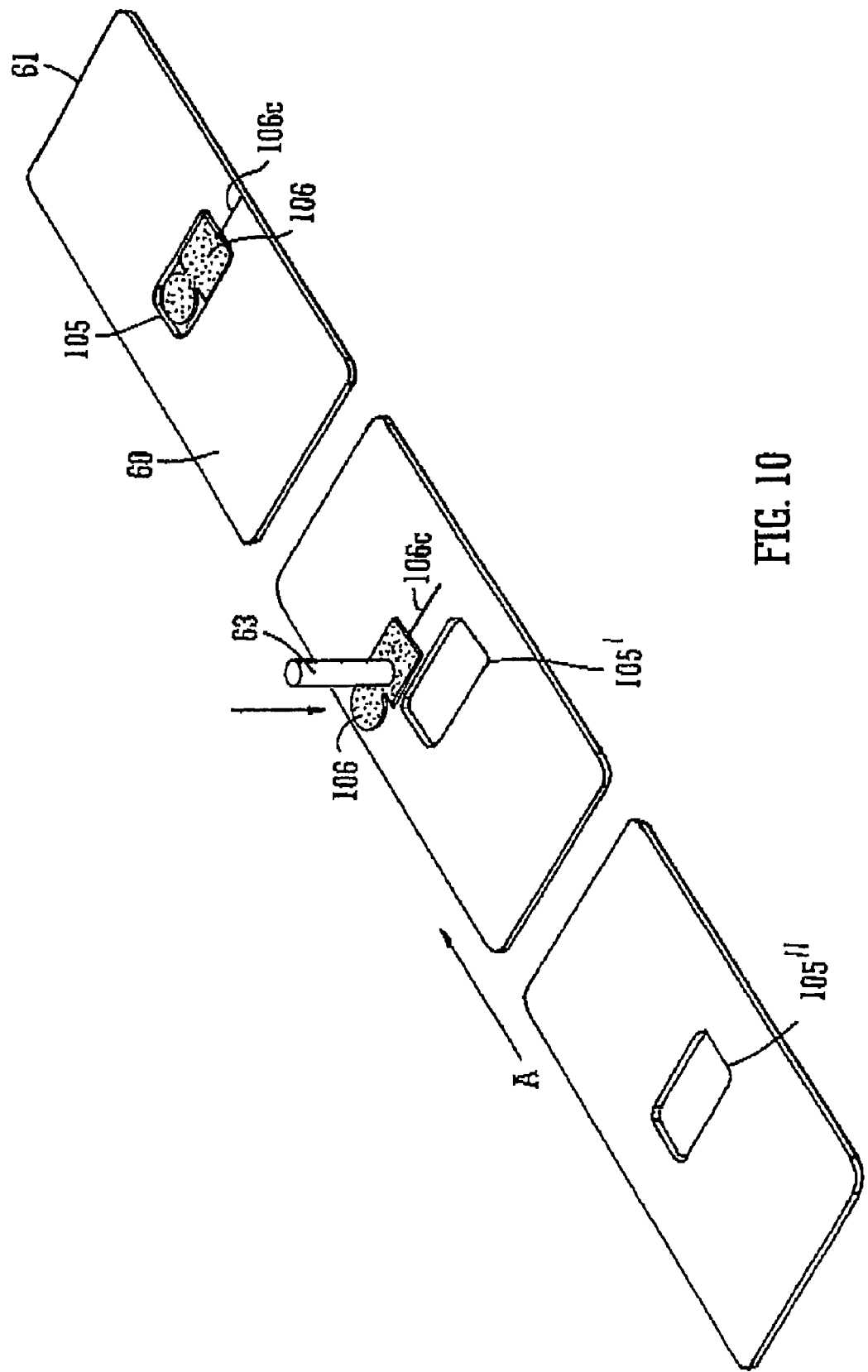
Figure 11:
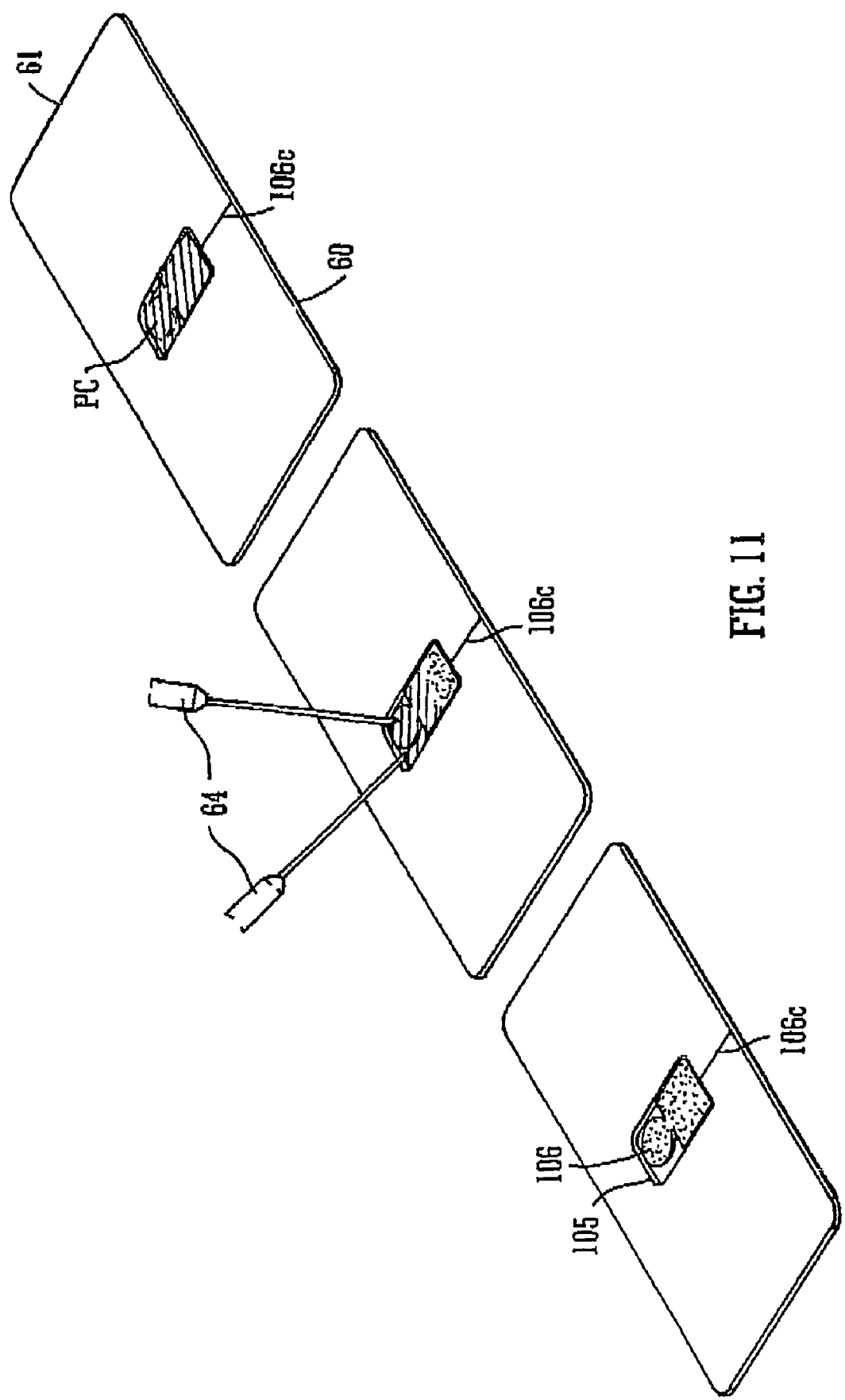
Figure 12:
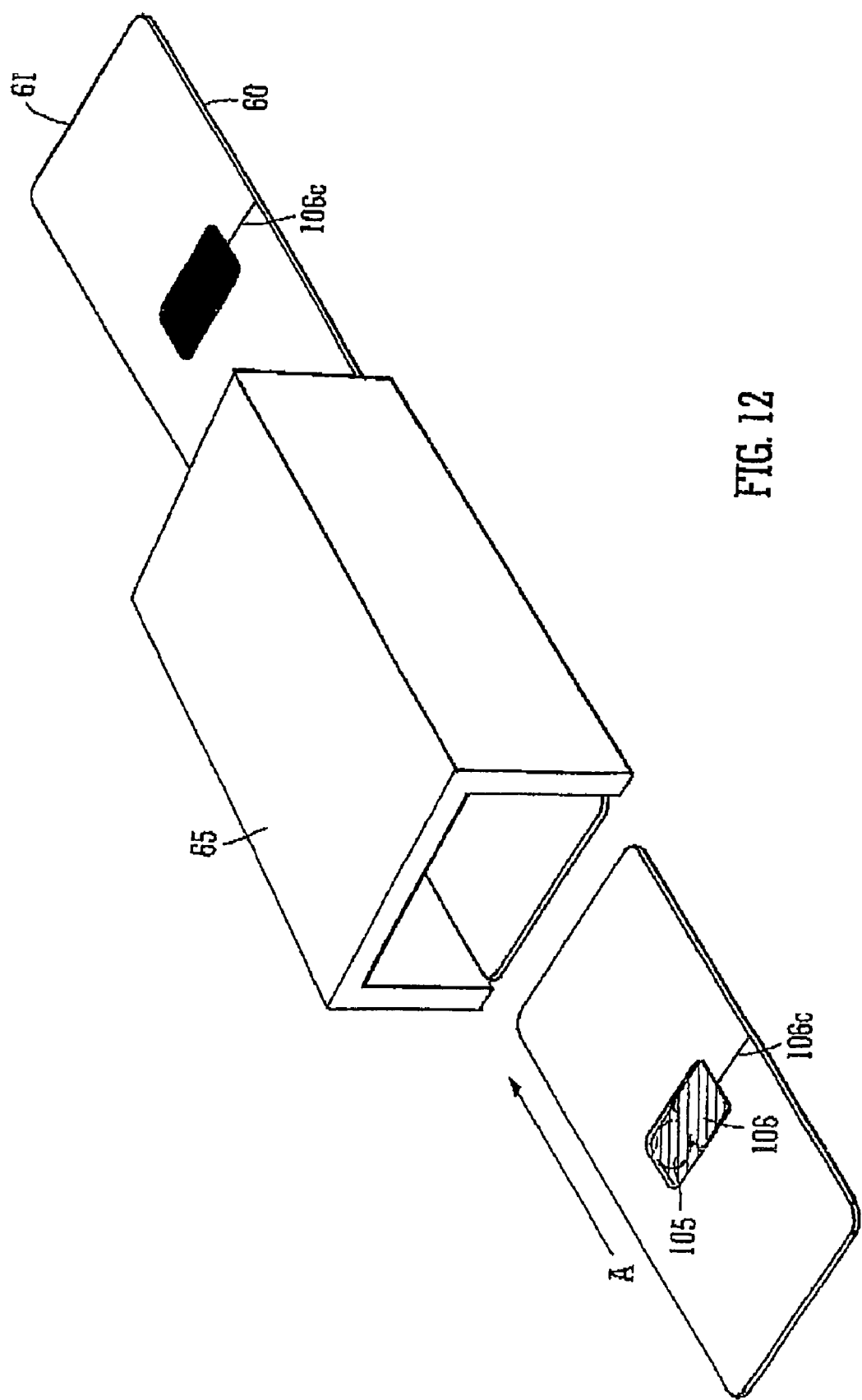
Figure 13:
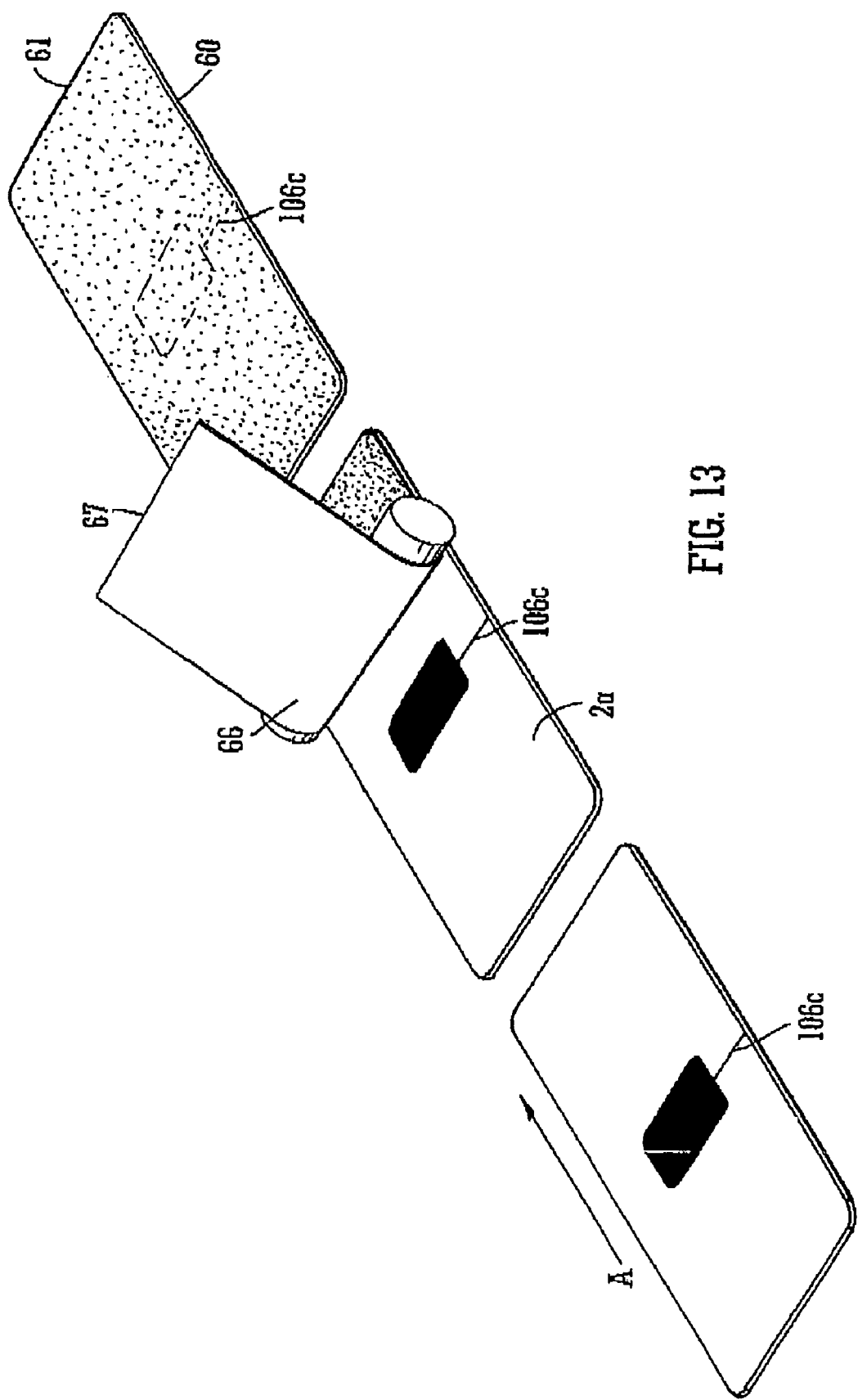
Figure 14:
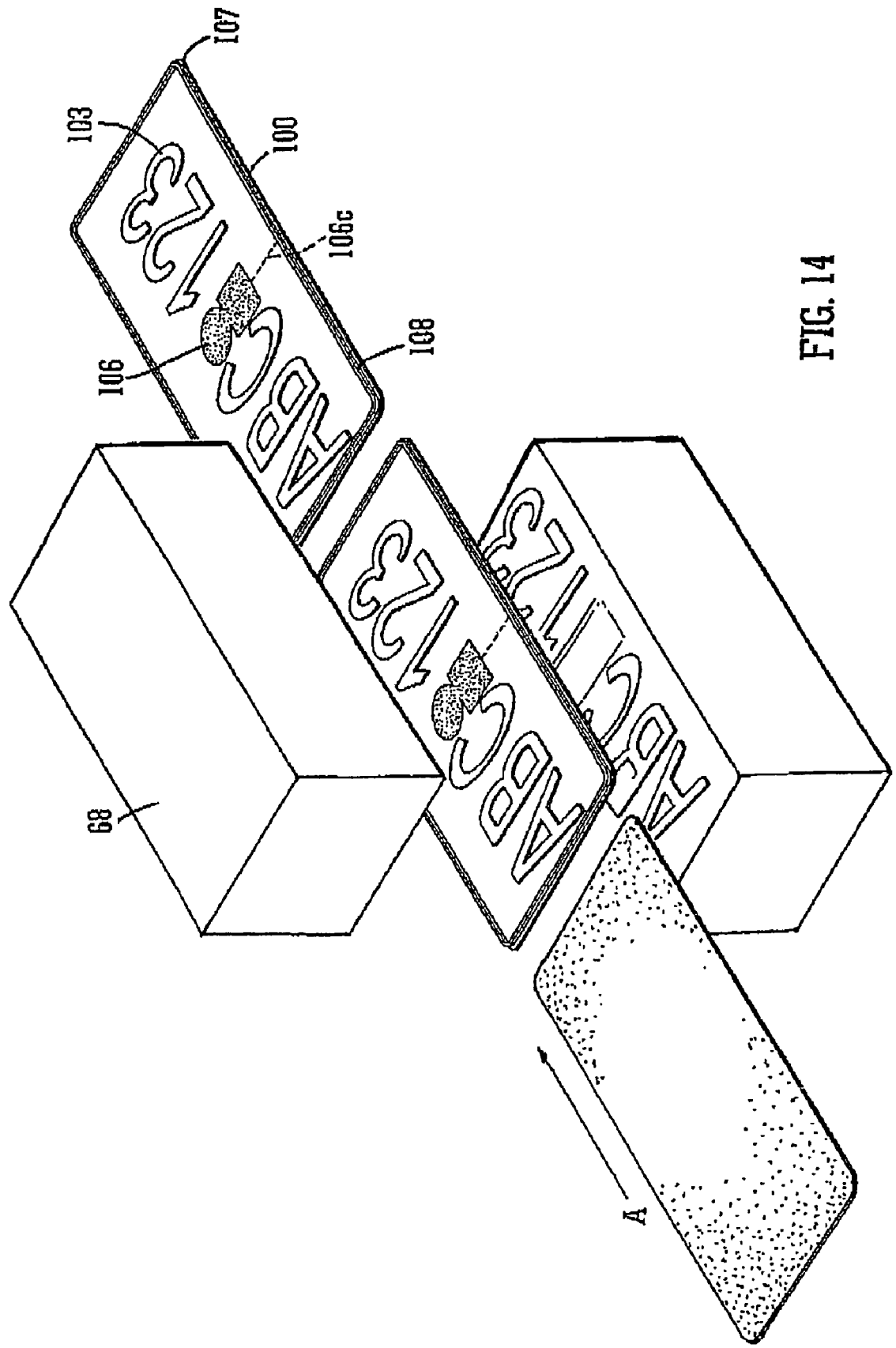
Figure 15:
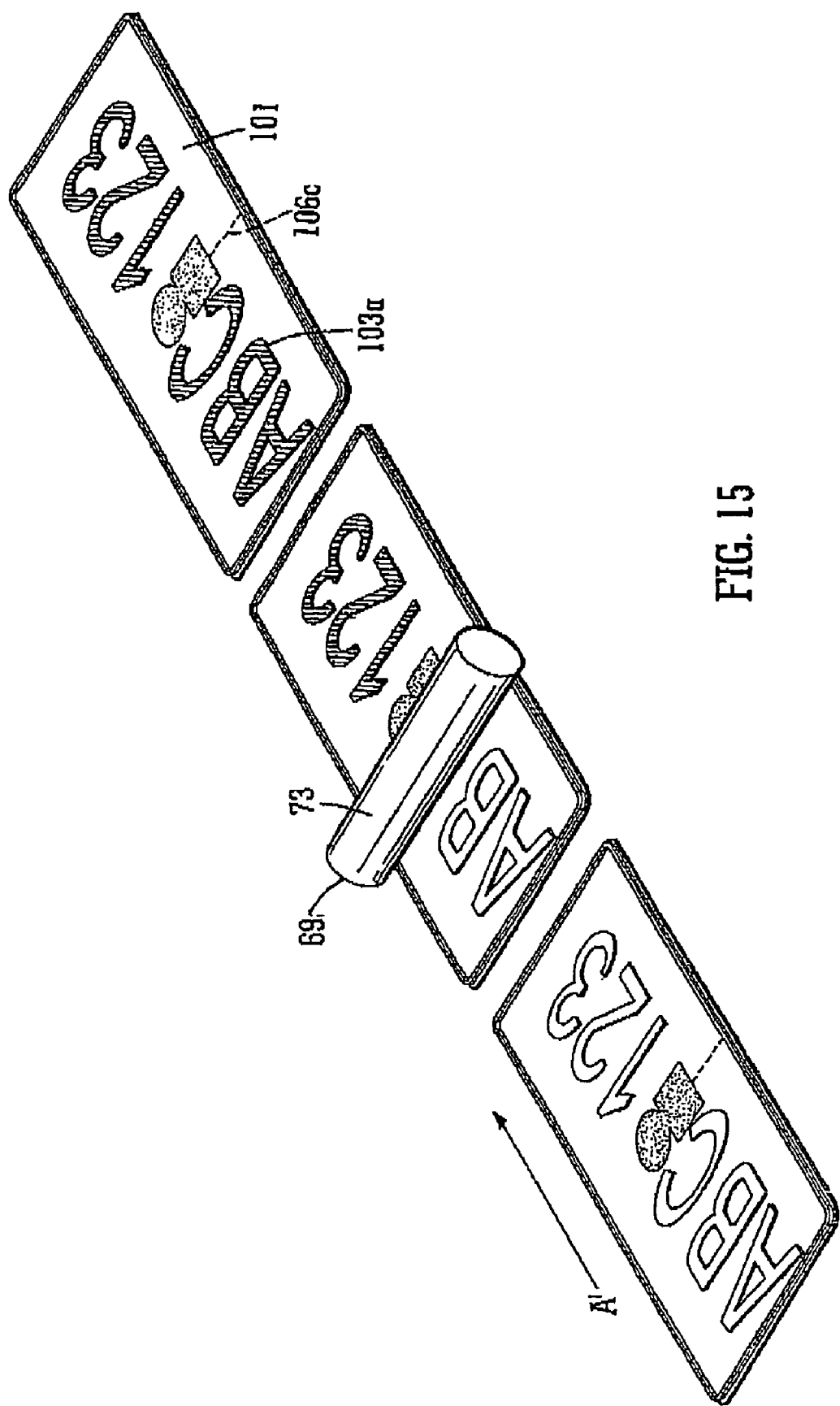
Figure 16:
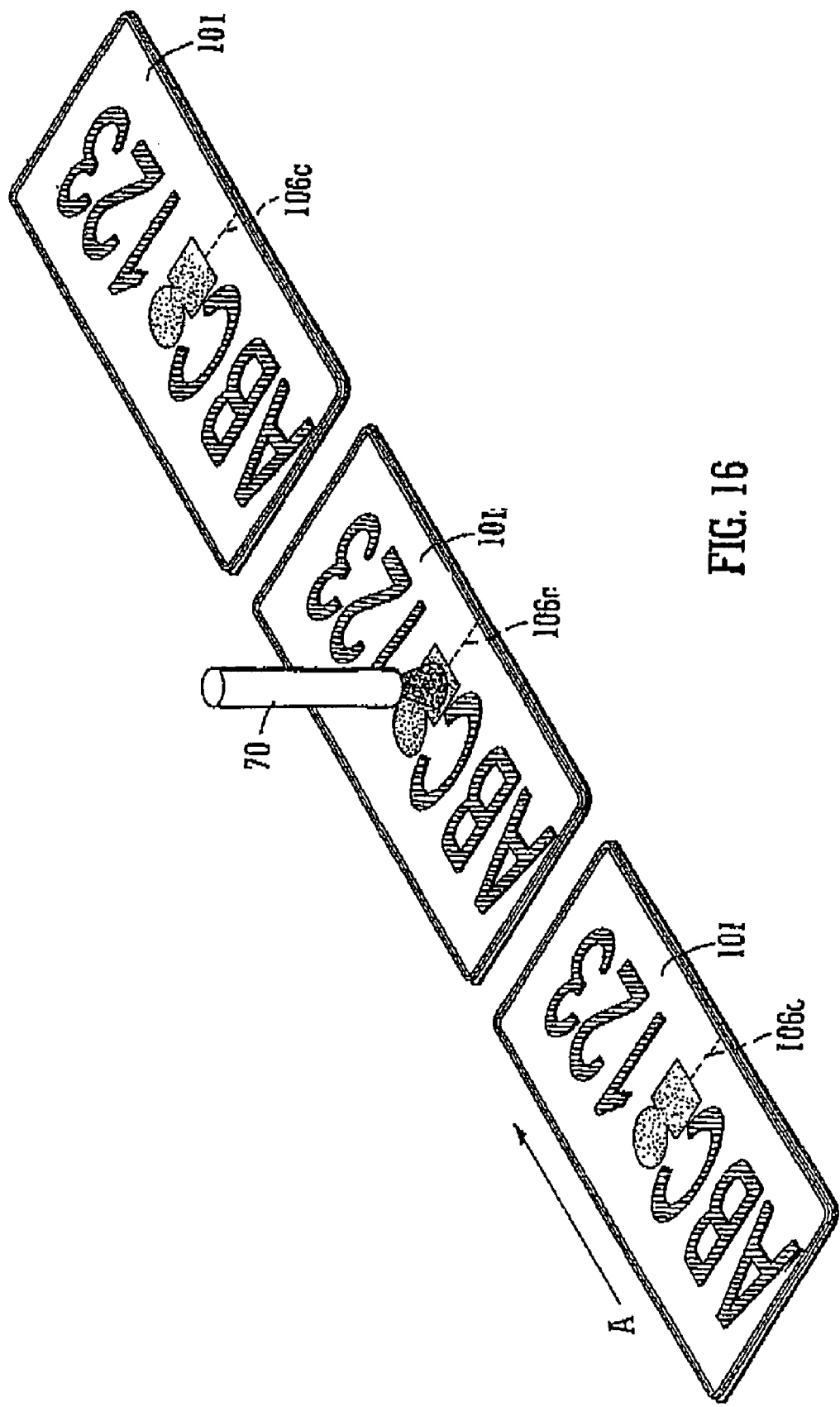
Figure 17:
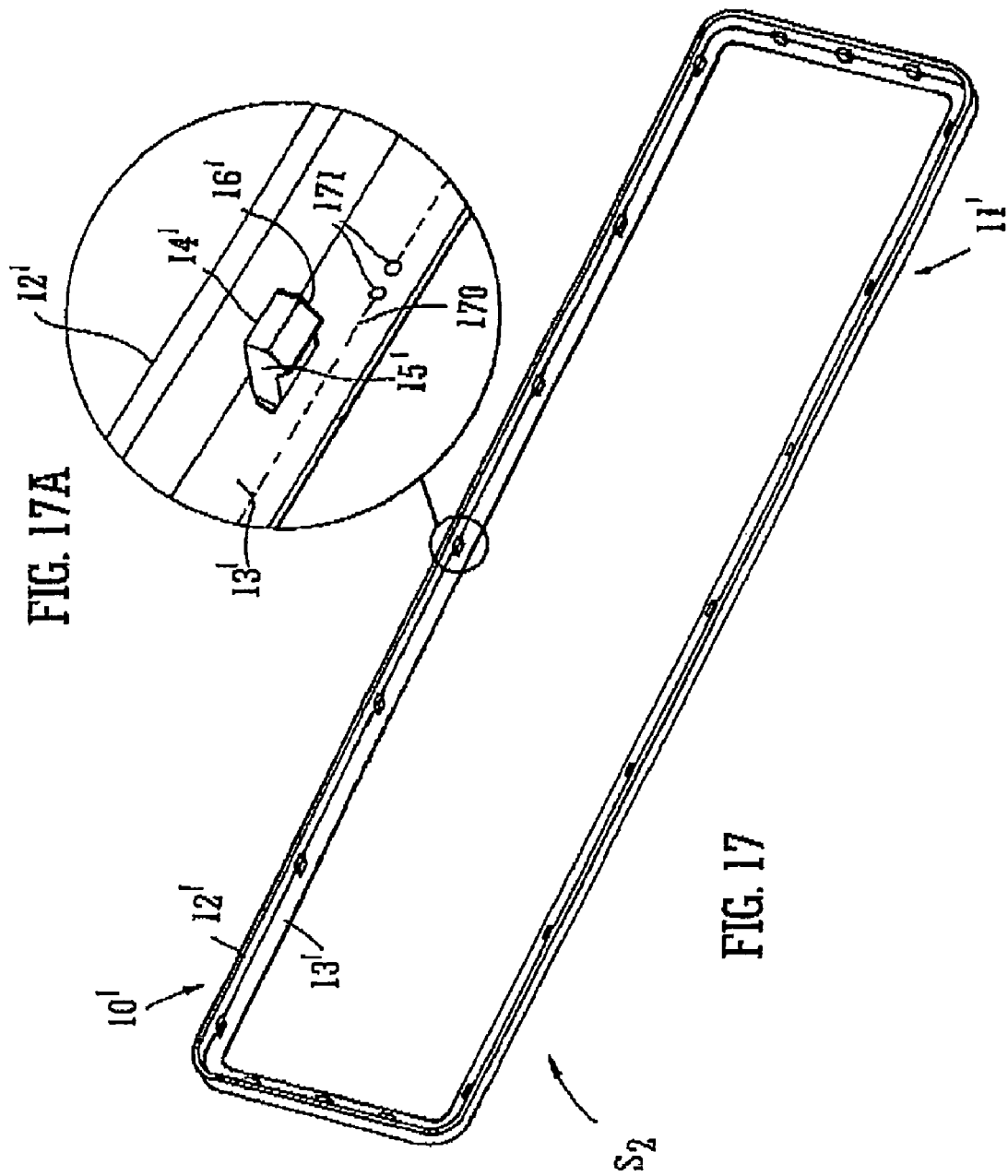

FIG. 8 is a schematic diagram of a sign according to an aspect of the invention;

FIG. 9 is a schematic diagram of a first step in a method of the invention;

FIG. 10 is a schematic diagram of a second step in a method of the invention;

FIG. 11 is a schematic diagram of a third step in a method of the invention;

FIG. 12 is a schematic diagram of a fourth step in a method of the invention;

FIG. 13 is a schematic diagram of a fifth step in a method of the invention;

FIG. 14 is a schematic diagram of a sixth step in a method of the invention;

FIG. 15 is a schematic diagram of a seventh step 1n a method of the invention;

FIG. 16 is a schematic diagram of an eighth step in a method of the invention;

FIG. 17 is a detail of a second embodiment or support;

FIG. 17A is a detailed view of part of FIG. 17.

Referring to FIG. 8, there is shown a sign in the form of a vehicle licence plate 101, comprising a body 102 to which indicia 103 have been applied.

The body 102 is an aluminium sheet which carries a retro-reflective sheet material 104 across a major surface 102a thereof.

Retained in a rebate 105 formed in the body 102 (as described below) is an electronic module 106, comprising a printed circuit board (PCB) 106a and a battery 106b, the PCB 106a having a number of components located thereon, as will be described below.

The body 102 is embossed to provide raised indicia 103a and a peripheral lip 107, the outer wall 107a of which being contiguous with a peripheral rim 108. The lip 107 is present to rigidify the plate 100 and may be absent. Marking material may be applied to the raised indicia 103a to ensure that the indicia 103 are visible, in use.

The lowermost wall of the rebate 105 formed in the aluminium sheet (i.e. as presented to the other, not seen, major surface 102b) extends out of the plane defined by the sheet. The peripheral rim 108 is arranged to extend the same distance out of the plane of the sheet, so that, if located on a flat surface, the sign 100 will be supported around its rim 108 and on its lowermost wall of the rebate 105.

The PCB 106a contains various components, such as one or more of a memory device, a signal generator, switch, and a clock or counter (all not seen). An on board antenna means may also be present although, as explained below, it may be absent.

The memory device (e.g. a WORM or a WMRM (write many read many) chip) contains desired information, for example information pertaining to a vehicle (e.g. vehicle licence number, Vehicle Identification Number (VIN), make, model, colour and so on) and/or, for example, information pertaining to the driver and/or owner of the vehicle (e.g. insurance details, date of purchase and so on). The signal generator is able to generate a signal according to some or all of the data held on the memory device and send that data for transmission by an antenna (as described below). The transmitted signal is usually encoded. A counter or clock may also be present which may note each transmission and provide a signal to instruct the signal generator to alter the encoding on the signal to be transmitted.

Extending from the PCB 106*a*, and connected to the signal generator, is a data transmission link 106*c*, which extends to or towards the peripheral lip 108. The link 106*c* is retained within a groove (not shown) formed in the plate 100 using adhesive, potting compound and/or an interference or friction fit. As will be appreciated, if the module 106 has an on-board antenna the transmission link 106*c* may be absent, as may be the corresponding groove.

In this way, the plate 101 is able to provide means for the remote detection of the passage of the vehicle to which it is attached. The detection of this signal may be useful in traffic management, access to restricted areas, toll road charging and so on as well as the apprehension of stolen vehicles, drivers driving without insurance or in vehicles without road worthiness (MOT) certificates.

Referring to FIGS. 9 to 16, a plate 101 is fabricated by unrolling a continuous length of aluminium 60 from a reel and advancing a leading edge 61 in the direction of arrow A to embossing apparatus 62 which forms (or embosses) the rebate 105 in the length 60 and the groove (not shown). As the length 60 is drawn through the machine 62 it embosses the length 60 at a position further along the length to form a second rebate 105', and so on along the length of aluminium 60. It will be appreciated that in FIG. 9 there is shown three plates blanks for clarity but these are, in reality, joined to form part of the continuous length 60, although it is within the ambit of the invention to use the method to produce single plates from individual blanks.

The length 60 is further advanced to a 'pick-and-place' region (FIG. 10) where 'pick-and-place' apparatus 63 places an electronic module 106 in each rebate 105, 105', 105". It will be appreciated that although the length of material 60 is a continuous length, the rebate 105, 105', 105" helps to ensure accurate location of the length 60 within the 'pick-and-place' apparatus 63.

Next (FIG. 11), the length 60 is advanced to a potting station 64 which covers each electronic module 106 with a potting compound PC to retain the module 106 within the rebate 105. The potting compound PC is flush with the major surface 102*a* of the length 60.

The data transmission link 106*c* is also 'potted' within the grove.

The length 60 is drawn through a heat tunnel 65 to cure or set the potting compound PC (FIG. 12).

The length 60 is then advanced to a laminating station 66 where a retro-reflective sheet material 67 is laminated across the major surface 102*a* of the length 60 to cover the potting compound-encased electronic module 106 and data transmission fink 106*c* (FIG. 13). The retro-reflective sheet material 67 need not have a discontinuous layer of metal applied thereto to permit electromagnetic radiation (e.g. specifically radio frequency electromagnetic radiation) to pass through the sheet material, although it may have such a sheet material, especially if on-board antenna means is used.

At this stage the length 60 is cut to plate-sized lengths 102 and may be stored subsequent to the next stages or, for example, may be distributed to individual plate distributors for further processing.

FIG. 14 indicates that the individual plate-sized substrates are then embossed by suitable embossing apparatus 68 to form a plate 101 having raised indicia 103 and a peripheral lip 107 (if required) and rim 108. In FIG. 14, a front and rear plate have been formed. It will be appreciated that the presence of the rebate 105 helps to ensure the accurate location and registration of the plate within the embossing apparatus 68, thereby helping to speed formation of the plates 101.

FIG. 15 indicates the application of a marking material 73 at a marking station 69 to provide the marked indicia 103*a*. A plurality of plates 101 may be marked in a continuous process.

FIG. 16 shows the last stage in the procedure whereby the plates 101 are moved past module activation apparatus 70 which imparts to the information storage device on the module 106 the information which is stored thereon, at least some of which may be transmitted.

Figure 18:
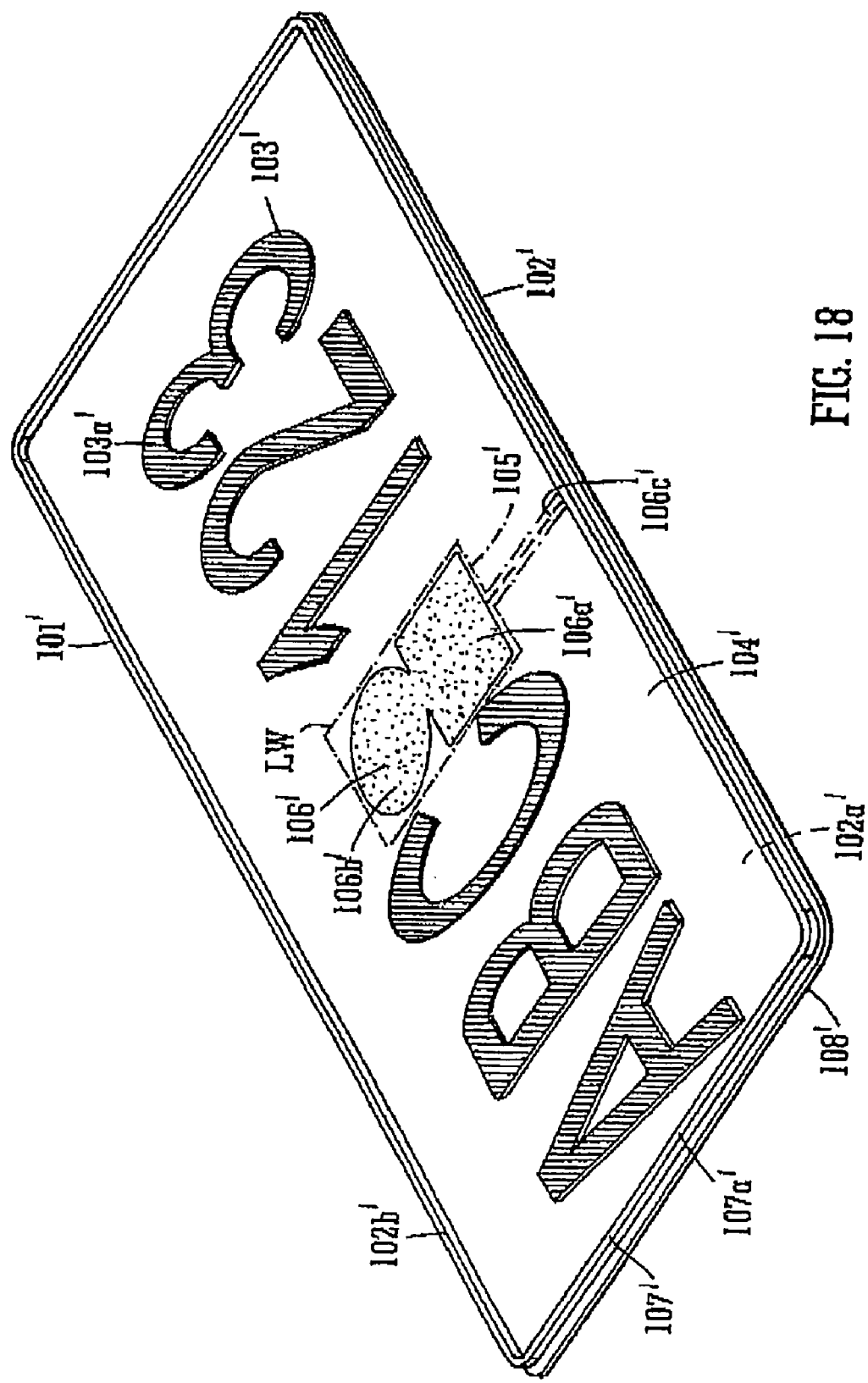

The aluminium length 60 may be formed with a series of lines of weakness formed therein to provide frangible portions (not shown) on the plate 101. Typically, the lines of weakness will surround the rebate 105 such that, when the plate is secured in place using adhesive, it will be arranged that the adhesive will be stronger than the plate in those frangible portion so that when a person attempts to remove (e.g. pries or rips) the plate 100 from the site-of-use, the rebate portion 105 (together with the electronic module 106) will detach from the plate 100 to either be left behind on the vehicle or be so detached from the plate as to render the plate 100 unusable—one such plate is shown in FIG. 18 and described below. The action of breaking the plate or removing it from the site may also be arranged to arrest operation of the electronic module 106 or to cause the electronic module to transmit an alarm signal for example by providing a contact to or across the aluminium at the line of weakness and/or by activating on board or out board switch means.

The plate 100 will typically be mounted to a support which is mounted to a vehicle. A suitable support and method of mounting is disclosed in our co-pending British patent application number 0418756.3 of 23 Aug. 2004 (the entire disclosure of which is herein incorporated by reference). The support may carry an antenna, for example, around its periphery to operably connect with the data transmission link 106*c*.

A support as previously disclosed in FIGS. 1 to 5 may be used although a more preferred support $S_2$ for the plate 100 will now be described in relation to FIGS. 17 and 17A which show perspective views of a second part of a second support according to the invention.

The first part 1 of the support $S_2$ is identical to that previously described in relation to FIGS. 1 to 5.

Referring now to FIGS. 17 and 17A, there is shown a second part 10' of the assembly of the invention which is a substantially rectangular frame 11' defined by a first wall 12' from which a further wall 13' extends inwardly and at substantial right angles to the first wall 12'.

Depending from the further wall 13' at various points along the length thereof are catch members 14' having a spigot 15' from which a catch 16' extends to point inwardly with respect to the first wall 12'.

The second part 10' has a loop antenna 170 moulded into the body thereof. At one point the contacts 171 for the antenna 170 are close to, or protruding from, the surface of the part 110 for connection to (either inductively or directly) to the terminal, distal part of said data transmission link 106*c*.

In use the support S₂ is assembled and located at a desired point of use as previously described.

The second part 10' is fitted over the installed and mounted first part 1 with the catch members 14' aligned with the apertures 7 and the second part 10' is pushed towards the first part 1. The first wall 12' of the second part 10' bounds wall 3. Continued pushing causes the catch 16' of the catch members 14' to snap-fit into engagement with surface 2a of the first part 1, thereby securing the second part 10' to the first 1 and retaining the plate 101 therebetween.

The inwardly extending further wall 13' overlies the periphery of vehicle identification plate to deny access to the edge thereof.

The nature and number of catch members 14' and apertures 7 are such that the second part 10' is extremely firmly held to the first part 1.

As before, to gain access to a retained number plate 100 it is necessary to break one or both of the first 1 and second 10' parts of the assembly.

Clearly, the antenna located in the second part 10' need be necessarily matched to the data transmission link 106c to ensure proper operation thereof. In order to force entry to the plate 100 it is necessary to break the second part 10' thereby snapping the antenna 170 and rendering the plate 100 unable to communicate. The breaking of the antenna 170 may cause a status change in the electronic module 106 thereby changing, arresting or starting a broadcast signal to inform about a removal event.

Once the assembly has been formed it is very difficult to gain access to the plate 101 and even more difficult to remove the plate 101 without causing damage which would render the plate unusable or, at least, would make it evident that the plate 101 had been removed from a proper location.

A further point of attack is to attempt to remove the assembly whole, i.e. with the plate 101 retained therein.

Typically, fasteners as mentioned above may be used.

The apertures 7 spigots 14' and catch members 16' may be, augmented with or in part or entirely, replaced by an adhesive. As above other securing means may be used in part or total.

Both 'active' and 'passive' plates may be provided. In a passive or semi passive tag information held on the information storage device is accessible once the module 106 has been interrogated and is not continuously or intermittently broadcast and/or transmitted, for example using Direct Short Range Communication (DSRC). In active tags the information or certain parts of it may be continuously broadcast or broadcastable.

In certain countries, notably Japan, retro-reflective licence plates are not required. In those countries, the retro-reflective sheet material may be replaced with other suitable sheet material.

The indicia need not be formed by embossing the plate 101. Indicia may be marked, for example, printed onto the retro-reflective sheet material (or non-retro-reflective sheet material) or may be printed onto a transparent sheet material which is then laminated onto the retro-reflective (or other) surface, as is disclosed in our co-pending European patent application no. 02727798.7 (published as EP 1399333) (the entire disclosure of which is herein incorporated by reference). The substrate may be plastic rather than aluminium, as is also disclosed in EP 1399333. In the case of a plastic substrate, the electronic module 106 may be located in the substrate or in a cavity therein. In which case the rebate 5' need not be present, nor need the rebate 6 in the support 1. In this case the wall 3 of the support 1 can be flush with the major surface 2a.

The plate 101 may further comprise a photovoltaic cell which is arranged to provide power for the electronic module 106 and/or to charge the battery.

A sign according to the invention may be used as a sign on a container, a railway carriage for cargo or passengers, as safety signs on roads or otherwise although, as above, particular utility will be found in the field of vehicle licence plates.

Whilst the above-method has been described in relation to a length of material, it will be appreciated that individual substantially substrate-sized lengths may be used and in which a rebate may be formed for retention of the electronic module.

The heat tunnel 65 may be replaced by other curing means, such as IR or UV curing station, for use with an appropriately cured potting compound.

It will be appreciated that the sign is self-contained in as much as no other connection is required for it to act as either a passive or active sign. Also, by providing suitable security measures it can be rendered unusable if removed from its intended site of use.

By separating the electronic module 106 and the antenna 170, the composite sign (i.e. sign retained in the support assembly) is more secure. Any attempt to remove the outer part 10' of the frame will destroy the antenna 170. The second part 10' may be provided with frangible portions to encourage fracture in certain parts either when it is attacked or when an attempt to prise the support from the vehicle is made. The (relatively) large antenna 170 enables signals to be transmitted and/or received across larger distances. Also, by separating the electronic module 106 and antenna 170, more space is provided onboard the plate for further electronic equipment and/or further batteries to increase range, increase lifetime and/or to increase processing capabilities.

Also, because the sign is a composite of sign 100 and support, the metal (or other material) of the sign 100 can be of much thinner gauge than would otherwise be acceptable and still pass the bend, impact and other tests required under European legislation.

As stated above, it is possible to provide lines of weakness in various components to increase security.

Figure 21:
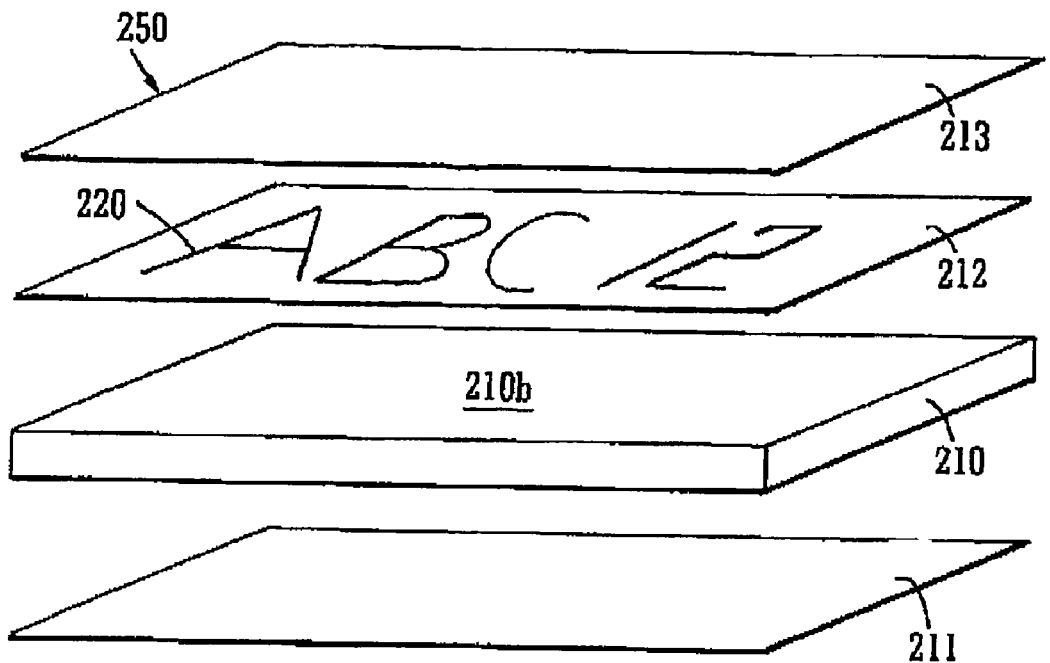
Figure 22:
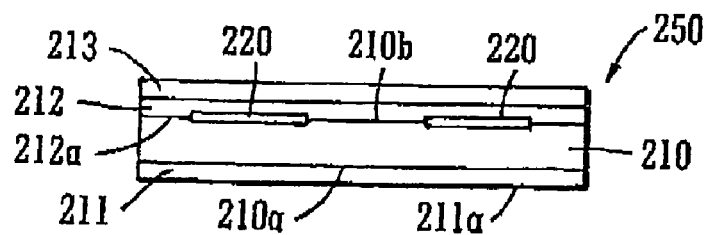

FIG. 18 is a schematic diagram of a sign according to the invention;

FIG. 19 is an isometric view of the front of a first part of a further embodiment of support according to the invention;

FIG. 20 is an isometric view of the rear of the part of FIG. 10;

FIG. 21 is an isometric view of the front of a second part of the assembly of the invention;

FIG. 22 is an isometric view of the rear of the part of FIG. 12;

FIG. 22A is a detailed view of part of FIG. 13; and

Figure 23:
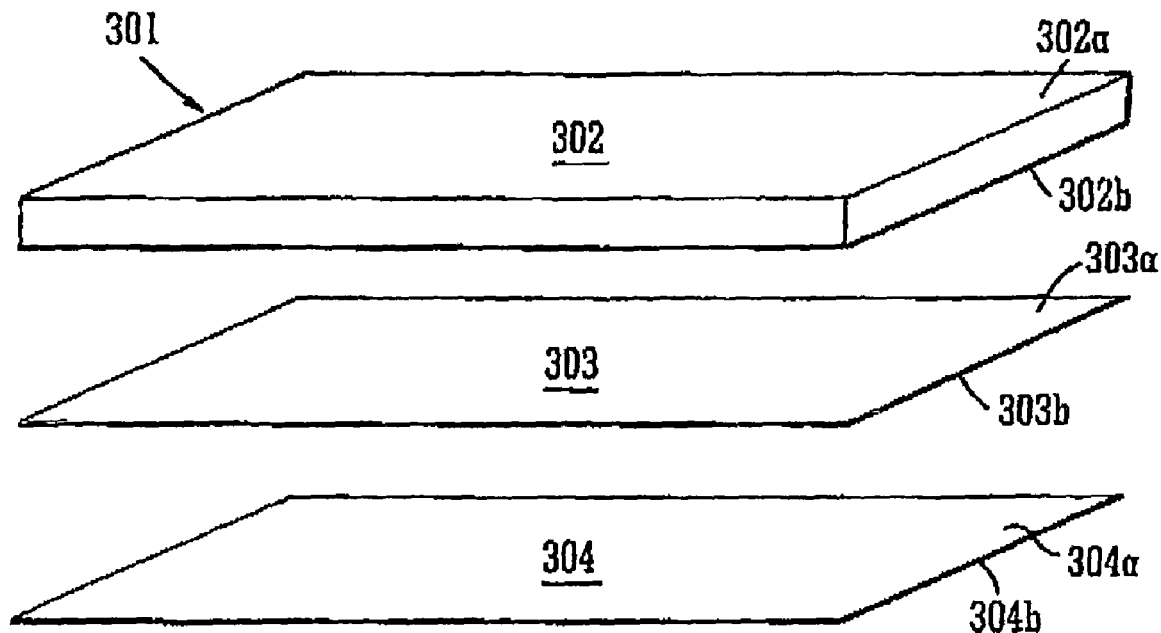

FIG. 23 is an isometric sectional view of the assembly of the invention.

Referring to FIG. 18, there is shown a sign in the form of a vehicle licence plate 101', comprising a body 102' to which indicia 103' have been applied as per the process described above.

The body 102' is an aluminium sheet which carries a retro-reflective sheet material 104' across a major surface 102a thereof.

Retained in a rebate 105' formed in the body 102' (as described below) is an electronic module 108', comprising a printed circuit board (PCB) 106a' and a battery 106b', the PCB 106a' having a number of components located thereon.

The body 102' is embossed to provide raised indicia 103a' and a peripheral lip 107', the outer wall 107a' of which abutting a peripheral rim 108'. The lip 107' is present to rigidify the plate 100' and may be absent. Marking material is adhered to the raised indicia 103a' to ensure that the indicia 103' are visible, in use.

The outer wall of the rebate 105' formed in the aluminium sheet (i.e. as presented to the other, not seen, major surface 102b') extends out of the plane defined by the sheet. The peripheral rim 108' is arranged to extend the same distance out of the plane of the sheet, so that, if located on a flat surface, the sign 100' will be supported around its rim 108' and at its rebate 105'.

The PCB 106a' contains various components, such as a memory device, a signal generator, a switch, and a clock or counter (all not seen).

As before, the memory device (e.g. a WORM chip and/or a WMRM chip) contains information pertaining to the vehicle (e.g. vehicle licence number, Vehicle Identification Number (VIN), make, model, colour and so on) as well as information pertaining to the driver and/or owner of the vehicle (e.g. insurance details, date of purchase and so on) or a selection of such information. The signal generator is able to generate a signal according to some or all of the data held on the memory device and send that data for transmission by an antenna (as described below). The transmitted signal is encoded. A counter or clock is also present which will note each transmission and provide a signal to instruct the signal generator to alter the encoding on the signal to be transmitted.

Extending from the PCB 106a', and connected to the signal generator, is a data transmission fink 106c', which extends to or towards the peripheral lip 108'. The link 106c' is retained within a groove (not shown) formed in the plate 100' using adhesive, potting, compound and/or an interference or friction fit. The link 106c' terminates in a connector (not seen) for connection to an outboard antenna.

Alternatively, the antenna (not shown) may be on-board or adjacent the PCB 106a'.

In this way, the plate 100' is able to provide means for the remote detection of the passage of the vehicle to which it is attached. The detection of this signal may be useful in traffic management, access to restricted areas, toll road charging and so on as well as the apprehension of stolen vehicles, drivers driving without insurance or in vehicles without road worthiness (MOT) certificates.

Also shown schematically are various lines of weakness LW which extend around the rebate 105' and the groove in which the date transmission link 106c' is provided. Other configurations of the lines of weakness LW are possible, for example, the line of weakness LW may run across the groove in which the data transmission link 106c' is located.

The lines of weakness LW are formed through the thickness of the body 102' to provide a frangible portion which is readily detached or detachable from the rest of the plate 101' during a removal event.

The lines of weakness LW are arranged such that, when the plate is secured in place using fixing means, e.g. a mechanical fixing or an adhesive, the fixing, e.g. adhesive, being stronger in contact with the frangible portion than with the rest of the plate 101', so that when a person attempts to remove (e.g. pries or rips) the plate 101' from the site-of-use, the rebate portion 105' (together with the electronic module 106') will detach from the plate 101' to either be left behind on the vehicle or be so detached from the plate as to render the plate 101' unusable. The action of breaking the plate 101' or removing it from the site may also be arranged to arrest operation of the electronic module 106' or to cause the electronic module 106' to transmit an alarm signal for example by providing a contact to or across the aluminium at the line of weakness.

The plate 101' will typically be mounted to a support which is mounted to a vehicle the above-identified supports may be used although a most preferred support for the plate 1 will now be described.

Referring to FIG. 19, there is shown a backing plate 1' which is substantially flat and has first and second surfaces 2a', 2b' which are bounded by a peripheral wall 3'. The first surface 2a' is intended to lie adjacent a substrate (not shown) to which the backing plate 1' is mounted.

The peripheral wall 3' stands proud of both the first and second surfaces 2a', 2b' to provide recessed areas 4a', 4b' respectively.

The upper surface 2b' is provided with a plurality of sunk rebates 5' in which the heads of screws or other fixing means (not shown) can be retained, as will be explained below, and a large rebate 6' (if required) to locate a corresponding protrusion (i.e. the rebate 106) formed on the plate 101' to be retained, again as explained below.

Around one, some, or each of the rebates 5', 6' ara lines of weakness ($LW_1$, $LW_2$) formed through the material of the backing plate 1'.

The peripheral wall 3' upstands from the second surface 2b' enough such that a plate is locatable in the area 4b' without standing proud of the wall 3'. Again, if the rebate 106 is not present the rebate 6' of the backing plate 1' need not be present.

On the other side, the peripheral wall 3' extends beyond the surface 2a' to ensure that the protuberance caused by rebate 6' does not extend beyond the wall 3'.

Located around the plate 1', adjacent on the peripheral wall 3', are a plurality of apertures 7', the purpose of which is identical to that disclosed in relation to FIG. 1.

In use, the first part 1' of the assembly will be secured to a substrate (not shown) using suitable fasteners such as screws, nuts and bolts or the fasteners previously described. Countersunk portions (not shown) are provided in the region of the sunken rebates 5' to ensure that the head of the fastener does not extend into the recessed area 4a'.

A vehicle identification plate is then located in the area 4b' and secured to the surface 26' of the backing plate 1' using for example an adhesive. Typically the adhesive will be laminated to the surface of the identification plate which is to face the backing plate 1' and will be protected by a release liner which will be removed prior to the application of the plate to the surface 26' of the backing plate 1'. Alternatively, the adhesive will be provided on the surface 26' of the backing plate 1'.

Because the heads of the fasteners are located in rebates 5', the facing surface of the plate is able to be brought into intimate contact with the majority of the surface 2b' to effect strong adhesion therebetween. Also, the provision of the rebate 6' allows the accommodation of a corresponding protuberance on the plate. Because the plate is located in area 4b' the access to the underside of the plate is restricted by the peripheral wall 3'.

The second part (i.e. either that shown in FIG. 3 or FIG. 17) is then fitted over the first part 1' with the catch members aligned with the apertures 7' and the second part is pushed towards the first part 1'. The first wall of the second part bounds wall. Continued pushing causes the catch of the catch members to snap-fit into 'engagement with surface 2a' of the first part 1', thereby securing the second part to the first 1' and retaining the plate therebetween.

The inwardly extending further wall overlies the periphery of vehicle identification plate to deny access to the edge thereof.

Therefore, to gain access to the number plate it is necessary to break one or both of the first 1' and second parts of the assembly.

In some embodiments the peripheral wall may be discontinuous to encourage a person to attempt to pry away the plate in a particular position, for example to encourage an attack to occur next to a particular line of weakness to ensure that the plate breaks during such an effort.

Once the assembly has been formed it is very difficult to gain access to the plate and even more difficult to remove the plate without causing damage which would render the plate unusable or, at least, would make it evident that the plate had been removed from a proper location.

A further point of attack is to attempt to remove the assembly $S_2$ whole, i.e. with the plate retained therein.

If such a removal event is attempted, the lines of weakness $LW_2$ surrounding the fastener rebates 5' will break, as will those LW surrounding the rebate 6' (if a fixing screw or other fixing to the vehicle is provided therein) which will cause the electronic module 5' to be detached from the plate 1'. Detachment of the module 5' may also cause localised stretching of the retro-reflective sheet material 4' attached or secured to the plate, e.g. the substrate or potting compound. If the retro-reflective sheet material 4' is also provided with lines of weakness (as is within the scope of this invention) then the sheet material may also break.

Depending on the fasteners used, an attempt to remove the assembly from, say, a car will cause substantial damage to the vehicle.

The plate may have a plastics substrate and the electronic module, if present, may be located in a rebate formed in the substrate. The rebate may open to the intended rear of the plate or may be within the body of the substrate, i.e. the module may be moulded or otherwise secured in the substrate. In which case, the data transmission link will preferably be adhered to the backing plate 1' of the support and will extend across a frangible portion so that, during a removal event, the transmission link will break and a portion of which will be retained with the frangible portion, thereby rendering the plate unusable. Other frangible portions on the plate may be provided. Frangible portions may be provided to cause breakage of the plate during removal events, whether or not the electronic module is present.

A further type of plate comprises a rigid transparent face layer to which is laminated a printed-upon retro-reflective sheet material. The retro-reflective sheet material may comprise lines of weakness. The plate is adhered to a support or other site-of-use with adhesives so that, during a removal event, the retro-reflective material will delaminate from the face layer, thereby rendering the plate unusable.

It will also be appreciated that fixing means can be fixed into a plate, a suitable construction is shown in FIG. 20 which is a sectional view through part of a plate 200 in partially exploded form for clarity.

The plate 200 has a body 201 with through holes 202 in which a fastener 206 is located. The plate 200 further comprises a rebate in which an electronic module 106" is located and from which a data transmission link 106c extends. Cover material 104' is adhered across the exposed major face of the plate 200, which cover material 104' may be a retro-reflective element (e.g. a reflective or retroreflective sheet material) with or without lines of weakness, a transparent layer which is flexible or rigid and so on. If the cover material 104' is transparent a retroreflective material will be located between the cover material 104' and body 201, preferably with the link 106c" not in view.

The plate 200 has lines of weakness $LW_3$ around the aperture. The transmission link 106c lies across the fixing 206 and is strongly adhered to the plate in that region.

The plate 200 is located in a backing plate 101' of a support, which is also provided with lines of weakness $LW'_3$.

To fabricate the plate 200, the fixings 206 are located in the apertures 202 prior to insertion of the electronic module 106" and transmission link 106c' which are then located in accordance with the above description, with adhesion in the region of the fixing 206. The sheet material 104' is then applied.

The plate 200 is located in a support 110' and secured to a site-of-use using the fixing 206.

During a removal event the lines of weakness $LW_3$, $LW_3'$ will break, causing the transmission link 106c to break and rendering the plate 200 unusable. Other frangible portions may be provided.

The plate 200 need not be provided with an electronic module 106" and/or data transmission link 106c. If not present, the plate 200 may be arranged to break to ensure that the plate 200 is readily 'identifiable as having been involved in a removal event. Passive and active plates may be provided.

Supports with frangible portions need not be in the two-part form disclosed above, they may comprise a backing plate only. Any or all of the plates discussed above may comprise fragmentable retro-reflective or other sheet material in selected areas or covering a surface thereof.

It will further be appreciated that because the above-discussed sign is a composite of sign and support, the metal (or other material) of the sign can be of much thinner gauge than would otherwise be acceptable and still pass the bend, impact and other tests required under European legislation. In other cases a tagged plate having frangible portions may be adhered or otherwise secured to a substrate without use of a support. A retro-reflective element may have indicia applied thereto and may have fragmentable portions and that element may be secured to a site of use.

Further signs for use with or without supports will now be described.

FIG. 21 is an exploded view of an identification plate according to the invention; and FIG. 22 is a sectional view through the plate of FIG. 21.

Referring to FIGS. 21 and 22, there is shown a number plate 250 for a vehicle having a plastics acrylic sheet 210 to a first face 210a of which is adhered a retroreflective sheet material 211 and to a second face 210b a transparent sheet material 212. The components being laminated together using suitable transparent adhesives (or adhesives which are transparent when cured).

The transparent sheet material 212 carries an opaque release liner 213 and a similar release liner may be applied to the free major surface 211a of the retroreflective layer 211 to protect an adhesive layer.

The transparent sheet material 212 carries indicia 220 which are 'reverse-printed' on to a major surface 212a thereof. Printing and lamination may be carried out according to GB 2376437 (the entire disclosure of which is herein incorporated by reference).

Typically, the transparent sheet material 212 carrying the release liner 213 will be conveyed to a printing station, and the indicia 220 are printed onto a major surface 210b of the transparent sheet 210 to which previously or subsequently a reflective or retroreflective sheet material 211 is adhered.

Alternatively, indicia 220 can be printed onto the upper major surface 210b of the plastics acrylic sheet material 210, or otherwise applied therebetween. Also, the indicia could be applied to the retroreflective sheet material 211 or to a combination of the components 210, 211, 212.

Typically the indicia 220 will be applied using a thermal mass transfer printer or laser printer.

The opaque release liner 213 need not be present, although it is preferred so as to protect the transparent sheet material 212 and provide additional rigidity during printing operatives.

Preferably, the reflective or retroreflective material has frangible portions or discontinuities or is adhered (e.g. laminated) to the lower major surface 210*a* of the plate 210 in a discontinuous manner with some parts adhered to the plate 210 stronger than others.

In a preferred embodiment the plate 201 will be secured to a support, such as that disclosed above.

In any case, the major surface 210*a* of the retroreflective material 210 will be adhered to the support. If an attempt is made to separate the plate 201 from the support, the discontinuities in the retroreflective 211 will break ensuring that the plate 201 shows evidence of tampering.

The plate 201 may be secured to a site-of-use (e.g. support) using fixing means (not shown) which can extend through holes. The areas surrounding the through holes may be defined by frangible portions arranged to break in the event of an attempt being made to prise the plate 201 from a support.

As an alternative, the adhesive used to bond the plate 201 to a support may be stronger (in part or across the width) than that used to bond the reflective layer 211 to the plate 210, to cause delamination during a removal event.

The plate 210 need not be formed from acrylic, other transparent plastics materials may be used.

A further plate construction is shown in the following wherein

Figure 24:
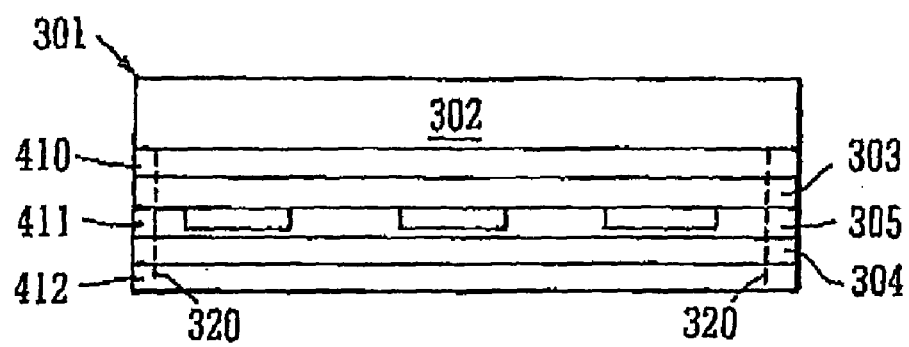

FIG. 23 is an exploded view of an identification plate according to the invention;

FIG. 24 is a sectional view through the plate of FIG. 22; and

Figure 25:
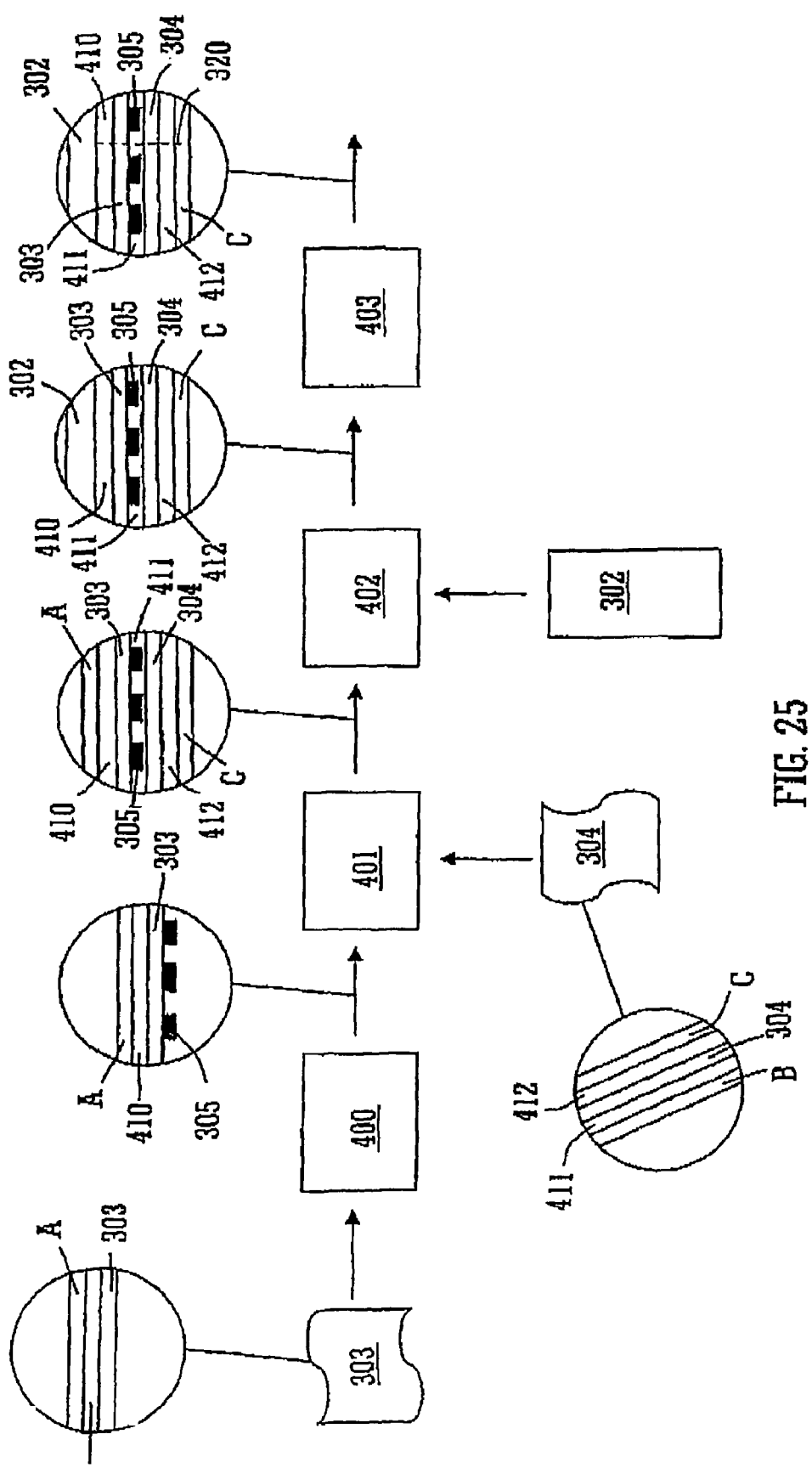

FIG. 25 is a schematic of fabrication of a plate of FIGS. 22 and 23.

Referring to FIGS. 23 and 24, there is shown a number plate 301 for a vehicle having a plastics acrylic sheet 302 having a first 302*a* and second 302*b* major face. Adhered to the second major face 302*b* is PVC or other plastics transparent sheet material 303 having first 303*a* and second 303*b* major faces. A reflective or retro-reflective sheet material 304, having first 304*a* and second 304*b* major faces is adhered to the second major face 303*b* of the transparent sheet material 303. The components 302, 303, 304 are laminated together using suitable transparent adhesives (or adhesives which are transparent when cured) 410, 411.

The second major face 303*b* of the transparent sheet material 303 carries indicia 305, which are applied in reverse so that they are 'normally' visible through the transparent panel 302 in use.

Cuts 320 extend through the reflective or retro-reflective sheet material 304 and transparent sheet material 303 to the second major face 302*b* of the transparent panel 302, the purpose of which will be described below.

To fabricate the plate 301 and referring to FIG. 25, the three components 302, 303, 304 are laminated together using suitable adhesives 410, 411.

Firstly, indicia 305 are applied to the second major surface 303*b* of the transparent sheet material 303. In order to facilitate printing onto the transparent sheet material 303 the transparent sheet material 303 may carry an opaque release liner A to protect the adhesive layer 410 previously applied to the first major surface 303*a* thereof.

Printing and subsequent lamination may be carried out according to the teachings of GB 2376437 (the entire disclosure of which is herein incorporated by reference). Typically, the transparent sheet material 303 carrying the release liner A will be conveyed to a printing station 400, and the indicia 305 are printed onto a major surface 303*b* of the transparent sheet 310.

Typically the indicia 305 will be applied using a thermal mass transfer printer or laser printer.

The reflective or retro-reflective sheet material 304 carries an adhesive 411, 412 on each major face 304*a*, 304*b* respectively, both of which are protected by release liners B, C.

At a lamination station 401, the reflective or retro-reflective sheet material 304 is adhered to the transparent sheet material 303 using adhesive 411 (exposed by removal of the corresponding release liner B) and heat and/or pressure.

The opaque release liner A need not be present, although it is preferred so as to protect the adhesive 410 applied to the first major surface 303*a* of the transparent sheet material 303. If the release liner A is absent the adhesive can be laminated to the transparent sheet material of the transparent plate before lamination of the two together. If the adhesive 410 is absent a release liner may be present. In either case, the presence of the release liner aids in the conveyance of the transparent sheet material 303 through the printing station 400.

The composite of the transparent sheet material 303 and reflective or retro-reflective sheet material 304 (the latter having the release liner C protecting the adhesive 412 in contact with the second major surface thereof) are then laminated at a further lamination station 402 to an acrylic transparent panel 302 by removing the release liner A protecting the adhesive layer 410 covering the first major surface 303*a* of the transparent sheet material 303 and adhering the composite to the transparent panel 302.

The identification plate 301 is then conveyed to a die cutting station 403 where one or more cuts 320 are made to extend through the release layer C, adhesive layers 412, 411 and 410, retro-reflective or reflective layer 304 and transparent sheet material 303. It will be noted that the cut or cuts 320 do not extend through the transparent panel 302, although they may extend into the panel 302 a short distance. Preferably, the cut 320 will extend around the entire periphery of the plate 301. Alternatively, the cut or cuts 320 may extend around entire portions of the transparent sheet material and reflective or retro-reflective sheet material of the plate 301.

In a preferred embodiment the plate 301 will be secured to a support, such as one of those disclosed above by removing the release liner C covering the adhesive layer 412 and forcing the plate 301 into contact with the support.

Preferably, all supports will encourage any attempt to prise the plate 301 from its associated support to be directed to the periphery or edge of the plate 301. If such an attempt is made to separate the plate 301 from the support, the cut or cuts 320 will cause a part of the composite one side of the cut 320 to be separated from a part the other side of the cut 320. In which way one part of the composite will be removed with the transparent panel 302 whilst one will remain adhered to the support. This will provide ensure that the plate 301 shows evidence of tampering.

The adhesive layer 412 may be applied unevenly, so that certain parts of the retro-reflective sheet material 304 are adhered more firmly to the support than other parts to facilitate breaking of the composite about the cut 320. In most embodiments the central part of the layer 412 will have more or additional adhesives to provide a stronger bond in that area to the support than around the periphery. In this case an attempt to prise the plate 301 from the support will cause the panel 302 to delaminate from the transparent layer in the central region to leave the identification field (i.e. the indicia 305) secured to the support and the transparent panel 302 to have the peripheral part, out side the cut 320, secured thereto.

As an alternative or additionally, the peripheral part outside of the cut 320, may have a release compound applied thereto to ensure that that part is more strongly adhered to the transparent panel 302 than to the support.

Alternatively, adhesive layer 412 and corresponding release liner C may be absent. In such a case an adhesive (such as a two-part epoxy adhesive) may be applied to one or both of the major surface 304b of the sheet 304 and/or the facing surface of the support. The support may have indents in the facing surface to encourage or allow pooling of adhesive in those areas. A consistent or non consistent application of adhesive may be carried out over one or both facing surfaces.

The supports disclosed in the above-identified applications comprise spigots on one part which engage corresponding apertures on the other. Additionally or alternatively, the two parts may be adhered together, for example using a two-part epoxy adhesive. One or both parts may have a peripheral trench to retain an applied bead of adhesive. The adhesive being located such that it adheres the two parts when they are brought into intimate contact.

Whilst the above description has identified one mode of operating the invention, it will be understood that indicia may be provided in a different location, for example on the first major face 303a of the transparent sheet material 303, in which case adhesive layer 410 will be provided on the transparent panel 302, which may or may not be protected by a release liner. Alternatively, indicia may be applied to the first major surface 304a of the reflective or retro-reflective sheet material 304, in which case the adhesive layer 411 will be provided on the second major surface 303b of the transparent sheet material 303. Of course, more that one set of indicia may be provided. Extra security measures such as machine-readable inks may be used. For example, fluorescent or phosphorescent inks may be provided on different or distinct parts or on distinct faces of the plate 301. Some of the sheet materials, 303, 304 may have pre-printed markings, such as manufacturers markings or a border. Different visual effects may be provided by printing on to different layers of the plate 301. Markings may be placed on the second major surface 302b of the transparent panel 302.

Moreover, the transparent sheet material 303 may be dispensed with. In which case, indicia 305 will be printed or applied to the reflective or retro-reflective sheet material 305 and the reflective or retro-reflective sheet material adhered to the transparent plastics panel 302. To site the so formed plate, a release liner will be removed from the free face of the reflective or retro-reflective material 304 to expose an adhesive which can be used to secure the plate to a site of use, as above.

Figure 26:
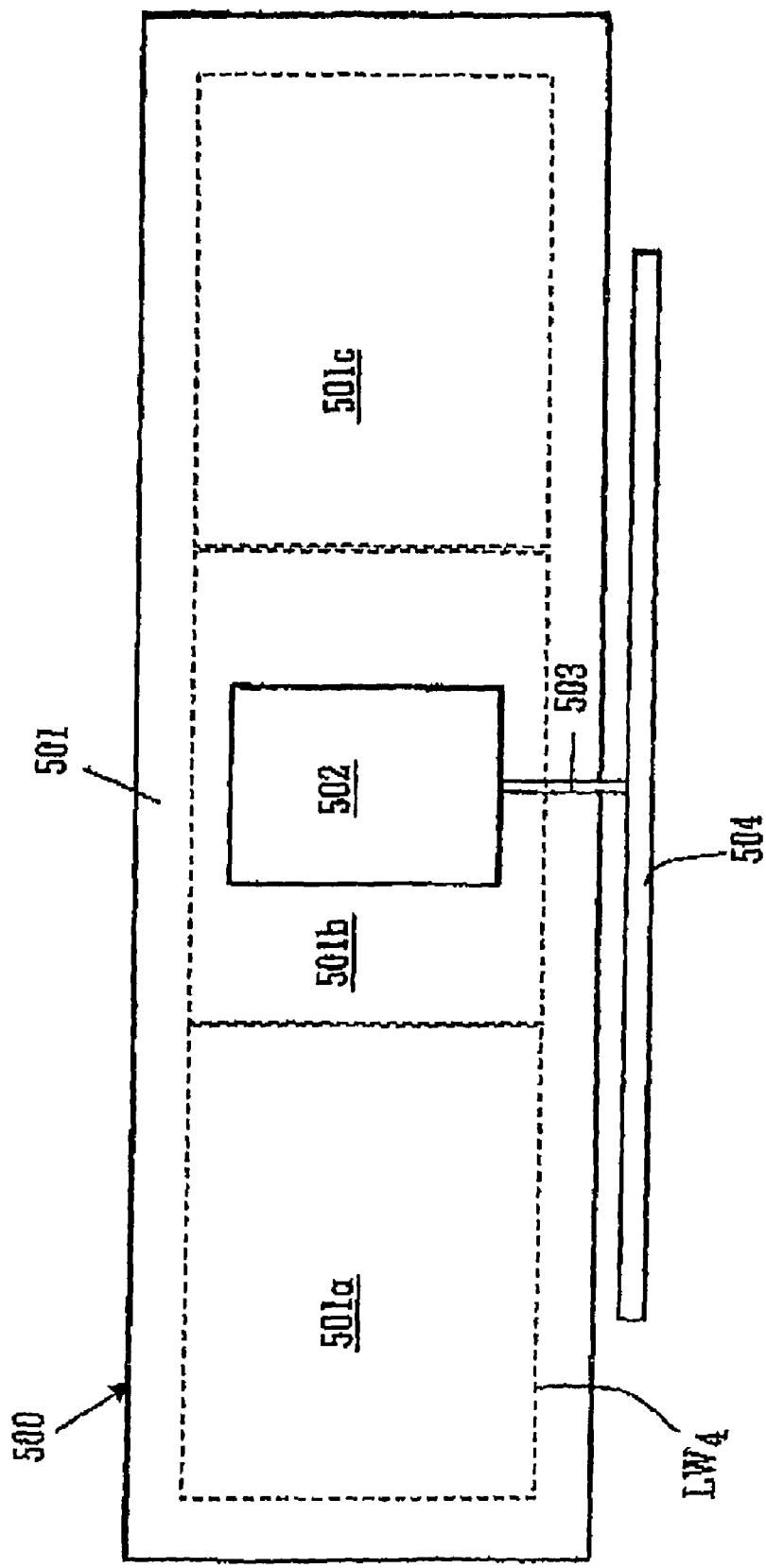

Turning now to FIG. 26, which is a schematic plan view of a further sign or identification plate according to the invention, there is shown a sign 500 having a substrate 501 able to bear indicia (not shown). The substrate 501 comprises a series of lines of weakness $LW_4$ which provide frangible portions 501a, b, c. The substrate 501 carries, that is, has embedded therein (e.g. integrally moulded therein) or provided in a rebate formed therein, an electronic module 502 which comprises at least a data register to hold data pertaining to the sign 500 and/or the intended location of the sign as well as further or different information, and preferably a power source. The data register may be provided on a WORM or WMRM chip, RAM, ROM or other memory device. Other electronic components may be present. A transmission link 503 is provided to allow transmission of a signal to and/or from the electronic module 502 from and/or to an outboard antenna 504.

The substrate 501 will preferably carry a retroreflective layer and a transparent cover layer, indicia being provided therebetween. In one particular embodiment the indicia may be applied according to the teaching of GB 2376437. Alternatively indicia may be applied to a retroreflective layer.

The retroreflective material will preferably comprise a plurality of reflective bodies retained in a matrix. The retroreflective material may have frangible portions or may be provided without a plastics backing material so that, when an attempt is made to delaminate the retroreflective from the substrate it breaks, fragments, tears and/or stretches so as to ensure that it is visibly apparent that it has been removed. Suitable retroreflective materials are those sold by 3M, with designations within the 5000 and 7000 range. These sheet materials can be used in the other plate constructions discussed above.

The sign 500 is preferably used with a support, for example one such as that described above. It is preferred that the support will have a series of frangible portions to match those corresponding to the substrate of the sign 600.

To install the sign 500, a backing of a support is secured to a site of use, preferably using security and/or expanding fittings (e.g. clutch head posidrive bolts) which will extend through one or more of the frangible portions in the backing support, the head of which preferably being retained in a counter sunk region.

The formed sign 500 is then located on the support (e.g. within a rebate of the support) using adhesive which is applied over an area corresponding to the frangible portions 501a, b, c. Self tapping or other screws may be used to secure the edges of the sign 500 to the support. The adhesive is chosen such that the bond between support and frangible portion is stronger than the frangible portion so that the frangible portion will preferably break during a separation event.

The outer member of the support may then be secured over backing member, e.g. using glue and/or mechanical fixings to overlie the edge of the sign 500.

Because the antenna 504 is outboard of the sign 500 there is no need to demetallise the retroreflective material. A rebate may be provided in the support to locate the antenna 504, or it may be located in the support, e.g. one or other parts of the support.

Should a person seek to remove sign 500 from a site of use the outer member of the support must first be removed. This act can cause considerable damage to the sign 500. If this is successfully completed any attempt to delaminate the indicia will result in damage to the retroreflective layer and/or the indicia.

If the person seeks to remove the sign 500 from the support the frangible portions 501a, b, c will be retained with the backing member of the support. As will be understood, such an attempt will cause the transmission link 503 to break. It will also be appreciated that the module 502 will be retained with the backing member of the support.

Should a person seek to remove the whole assembly (i.e. support and sign 500) from a site of use, the frangible portion of the support and the sign frangible portions 501a, b, c will be retained in place, similarly causing the sign 500 to be rendered inoperable.

In preferred embodiments a switch, either electronic, electrical or mechanical, is provided in the module 502 which alters the state of the module 502 subsequent to a removal event, such as when the transmission link 503 is broken.

Clearly more or fewer frangible portions 501a, b, c may be provided, which may also have different shapes or configurations. The substrate 501 can be formed of plastics, polymeric materials or from metal, e.g. aluminium. If the substrate 501 is formed of aluminium or another metal (including alloys) the module 502 may be adhered to a rear most surface thereof, for example using a potting compound or, the like.

The module 502 may be retained in a plastics or other matrix which is adhered or otherwise secured to a frangible portion 501b of the sign 500.

If an electronic (either passive or active) sign is not required, a support as modified above can be used with an acrylic or other transparent plastics front face construction sign having retroreflective which is tearable (e.g. is not provided with a plastics backing layer) or which is provided with one or more frangible portions, preferably to at least partially correspond with the frangible portions of the support.

In this case the electronic module may be provided in the support. It will be appreciated that the constructions described in relation to FIGS. 21 to 26 may also be used with such a support, or with a support absent electronic module.

Figure 27:
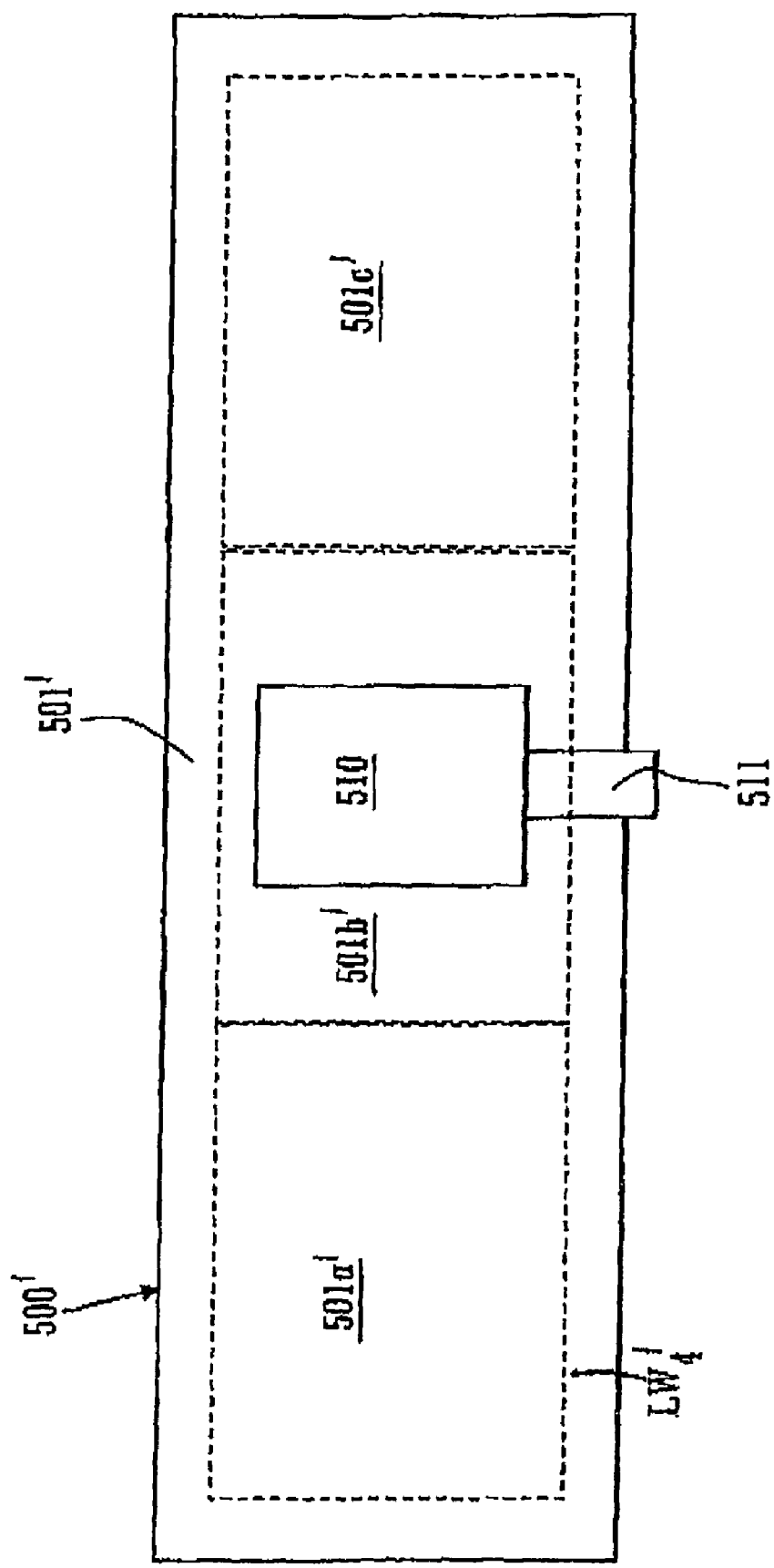

FIG. 27, which shows a similar sign 600' to that shown in FIG. 26 (like components being designated by a prime (')) having a substrate 501 comprising lines of weakness $LW'_4$ to define frangible portions 501a', b', c' and an electronic module 510 carried thereby.

The module 510 carries the same components as above but also on-board antenna means.

A security fixing 511 is provided to specifically secure the module 510 to the support. The security fixing may also be operably connected to the electronic module 510 to cause a change of status therein during or subsequent to a removal event.

Figure 28:
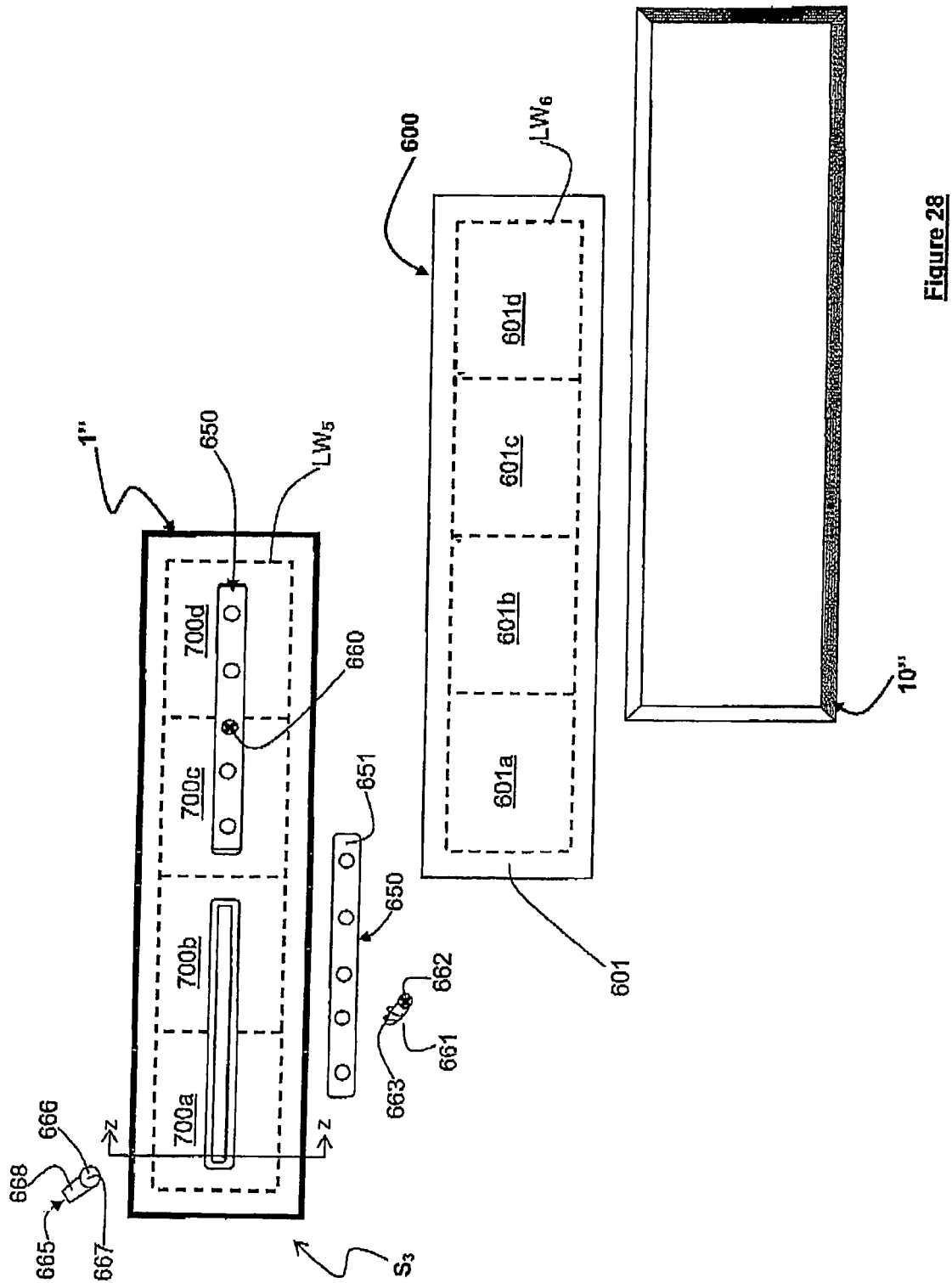

FIG. 28 is an exploded view of a further sign and support assembly according to the invention.

Figure 29:
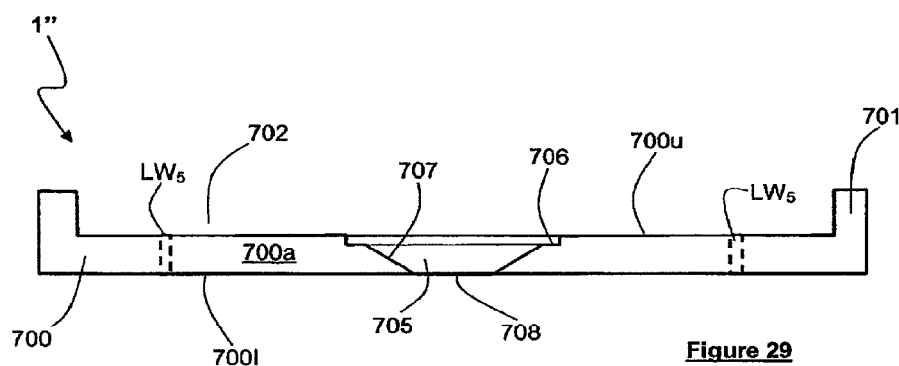
Figure 30:
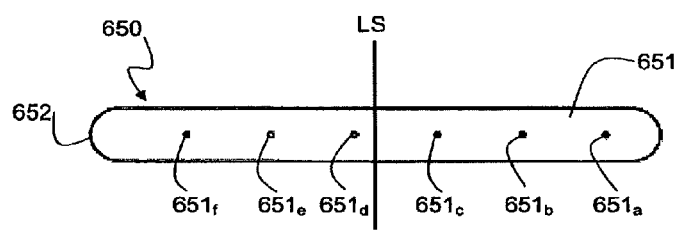

FIG. 29 is a sectional view of part of the support of FIG. 28.
FIG. 30 is a plan view of part of the support of FIG. 28.

In FIG. 28 there is shown a two-part support assembly $S_3$, comprising a first part 1" to provide a backing portion and a second part 10" to provide a frame portion.

The second portion 10" may be similar or identical to that described above in relation to FIGS. 3 to 5 and 17, 17A.

Located between the first 1" and second 10" parts is a sign 600, such as a numberplate (which is shown without any indicia or other markings for clarity only).

Also provided is a pair of washers 650 and a pair of two-part fasteners 660 comprising a male part 661 with a driveable chamfered head 662 and a threaded shank 663 and a female part 665 having a flat head 666 and an aperture provided with an internally threaded bore 667 provided within a shank 668 which can expand to provide a flange (not shown).

The sign 600 comprises a plurality of lines of weakness $LW_6$ which sub divide the body 601 into a plurality of frangible portions 601a, b, c, d.

The details of the first part 1" of the support $S_3$ are best shown in FIG. 29. The first part 1" comprises a substantially flat body 700 having (as shown) an upper surface 700u and a lower surface 700l and an upstanding wall 701 which bounds the upper surface 700u to provide a rebate 702 for reception of the sign 600. The height of the wall 701 will typically be designed such that an edge of a plate 600 received in the rebate 702 does not stand proud of the wall 701.

The body 700 of the first part 1" is delimited by a series of lines of weakness $LW_5$ to provide a plurality of frangible portions 700 a, b, c, d.

Running along a centre line of the first part are a pair of elongate rebates 705. Each rebate 705 having a pair of matched steps or shoulders 706 and chamfered sides 707 leading to an aperture 708.

As shown in FIGS. 28 and 29, each elongate washer 650 has a body 651 with a plurality of through holes 651a, b, c, d, e, f formed therein. As will be appreciated from FIG. 30, the through holes 651a-f are not distributed symmetrically about a line of symmetry LS of the washer 650. The washer 605 has rounded ends 652, and the through holes 651a-f are preferably countersunk.

In use, the washers 650 are receivable in the elongate rebates 705 such that the body 651 of the washer 658 is retained by the shoulders 706 of the rebate 705. The male part 661 of a fastener 660 is receivable in one of the holes 651a-f of the washer 650. Because the holes 651a-f are usually countersunk, the head 662 of the male part 661 will not protrude beyond the upper surface of the washer 650.

As is indicated in FIG. 28, the elongate rebate 705 is longer than the washer 650 so that the washer 650 (prior to being secured) is free to slide within the rebate 705.

Clearly, because there are five (FIG. 28) or six (FIG. 30) apertures 651a-f formed in the washer 650 there are five or six points through which the male part 661 of the fastener 660 can extend. Also, because the washer 650 can move within the rebate 705 the apertures 651a-f are provided with a further degree of freedom (in one embodiment the washer 650 is 14 mm shorter than rebate 705, thereby providing 7 mm of movement for the centre of each aperture 651a-f. Also, because the apertures 651a-f are not symmetrically disposed about the line of symmetry LS, by rotating the washer 650 through 180° the centres of the apertures 651a-f are brought to a different position. In this way, a centre of an aperture 651 a-f can be positioned at substantially any point along the aperture 708 of the rebate 705. Other configurations and numbers of holes may be used. This enables fixing of the support $S_3$ to be more flexible and, for example, allows a single support to be mountable at a variety of sites. For example, the support $S_3$ can be used with the captive fixing means provided on different cars by the manufacture of vehicles.

To secure the sign 600 to a site of use (e.g. to a vehicle), the washers 650 are located in the rebate 705 of the first part 1" of the Support $S_3$ and a male part 661 of a fastener 610 is received in an appropriate aperture 651a-f. The female part 665 of the fastener 650 is threaded on to the male part 661 and the male part 661 is driven thereinto using an appropriate tool which causes the flat head 666 of the female part 665 to be brought to bear against the lower surface 700E of the first part 1" of the support $S_3$ and causes the flange (not shown) to expand to bear against the facing surface of site of use (e.g. the vehicle).

With the first part 1" of the support $S_3$ secured to a site of use, adhesive is then applied over substantially the whole of the upper surface 700u of the first part. Adhesive is typically also applied to the parts of the washer 650 which correspond and overlie with frangible portions 700a and 700d of the first part 1' of the support $S_3$ but not the other parts.

The plate 600 can then be adhered to the upper surface 700u of the body 700 of the first part 1" of the support $S_3$.

The adhesive may be applied to the rear of the plate 600 and be protected by a release liner, or may be directly applied to the first part 1" of the support $S_3$.

The second part 10" of the support $S_3$ is then secured, preferably permanently secured, e.g. clipped and/or adhered, to the first part 1" to secure the plate 600 there between.

The plate 600 may have an electric or electronic device located therein or thereon, preferably in or on one of the frangible parts 601b or 601c. The device may have an onboard antenna or connection means for operable connection to an outboard antenna, which may be in another part of the plate 600 or in one or other of the first 1" and second 10" parts of the support $S_3$.

The second part 10" of the support S₃ may have lines of weakness (not shown).

Should an attempt be made to remove the plate 600 in one piece (i.e. Including the support S₃) from the site of use, the frangible portions 700 *a-d*, 601*a-d* of the support S₃ and plate 600 will break from the periphery, thereby rendering the plate 600 useless.

Should an attempt be made to remove the second part 10" of the support S₃ it may (or will if lines of weakness are provided) break. The wall 701 denies or inhibits access to the rear of the plate 600.

Should an attempt be made to remove the plate 600 from the support S₃ the lines of weakness LW₅ on the plate 600 will break, leaving the frangible portions 601*a-d* adhered to the lower surface 700*t* of the first part 1" of the support S₃.

Should an electronic module be present it will be retained with the frangible portions 601*b*, 601*c*. If an outboard antenna is provided in the second part 10" of the support S₃ the removal of that part 10" will cause the signal to be arrested which may be arranged to change a register in the electronic module.

In each case the strength of the bond provided by the adhesive will be stronger than the strength of the lines of weakness.

In a preferred embodiment, a plate made in accordance with GB 2376437 will be used. Preferably 5000 series retroreflective material supplied by 3M will be used, so that if an attempt is made to remove the indicia from the substrate of the plate 600, the retroreflective sheet material will fragment. Other retroreflective sheeting may also be used which has discontinuities.

In this specification the term sheet material, sheet or similar is intended to refer to a flexible, thin member.

it will be appreciated that, although several distinct embodiments have been disclosed, those embodiments may be combined and/or elements of each may be combined, substituted or deleted, the scope of the invention being determined by the broadest statements of invention and/or the Claims appended hereto. For example, any of the plates may be used with any of the supports. Features from one support may be used with a different support. Features from one plate may be incorporated in place of or in addition to features from another plate.

The invention claimed is:

1. A support assembly for attachment to a substrate comprising a support and a second part, wherein said support comprises a rebated surface to which a sign is securable and fixing points engageable with fixing means to secure the support to the substrate, said second part comprising a peripheral wall sized and dimensioned to bound said support and a continuous facing wall joined to or contiguous with said peripheral wall, the support and second part being securable together whereby said continuous facing wall overlies at least part of a peripheral portion of the rebated surface of said support to retain, in use, the sign therebetween, wherein the support and/or second part comprises separable portions defined by one or more lines of weakness to provide frangible portions.

2. An assembly as claimed in claim 1, wherein the support and second part are permanently secured or securable together.

3. An assembly as claimed in claim 1, wherein one or both of the support and second part comprises one or more spigots which are engageable with a part of the other of the support and second part to provide mutually co-operable means.

4. An assembly as claimed in claim 3, wherein the spigots are arranged to provide a snap-fit engagement.

5. An assembly as claimed in claim 3, wherein at least some of the spigots depend from the facing wall of the second part and are engageable with, or engage, corresponding apertures provided in the support.

6. An assembly as claimed in claim 1, wherein the support and second part are secured or securable together using adhesion means.

7. An assembly as claimed in claim 6, wherein one or both of the support and second parts comprise one or more rebates, or other areas, for the location of adhesion means.

8. An assembly as claimed in claim 1, wherein the support comprises at least one upstanding wall.

9. An assembly according to claim 8, wherein said at least one upstanding wall at least partially bounds the rebated surface for location of the or a plate.

10. An assembly according to claim 8, wherein the or each upstanding wall has one or more apertures disposed therein and/or thereabout for the reception of a, the or some spigots.

11. An assembly according to claim 1, further comprising an antenna.

12. An assembly as claimed in claim 1, wherein the support comprises means for the location of an antenna.

13. An assembly according to claim 11, wherein said antenna comprises a loop antenna arranged to extend at least partially around the periphery of the support or second part.

14. An assembly according to claim 11, wherein said antenna comprises a patch antenna.

15. An assembly as claimed in any of claim 11, wherein said antenna is located in the second part.

16. An assembly as claimed in any of claim 11, wherein said antenna is moulded in the support or second part.

17. An assembly according to claim 1, wherein the support and/or second part comprise one or more fixing areas through which fixing means are extendable or to which fixing means may be secured for securing said support to a site-of-use.

18. An assembly according to claim 17, wherein the or at least one of said fixing areas is defined by one or more lines of weakness to provide one or more frangible fixing area portions.

19. A combination of an identification plate or sign and a support assembly as claimed in claim 1, the identification plate or sign being secured or securable to the rebated surface and whereby said continuous facing wall overlies at least part of a peripheral portion of the rebated surface of said support, the plate or sign being retained within the assembly whereby access to the edge of the plate or sign is prevented or inhibited.

20. A combination as claimed in claim 19, wherein the plate or sign is secured or securable to the rebated surface of the support using adhesion means.

21. A combination as claimed in claim 19, wherein the plate or sign comprises a substrate to which a retro-reflective and/or other sheet material is secured.

22. A combination according to claim 21, wherein the substrate is a backing plate or a transparent plate.

23. A combination as claimed in claim 21, wherein indicia are applied to the retro-reflective or other sheet material.

24. A combination as claimed in claim 21, wherein the retro-reflective and/or other sheet material comprise frangible portions.

25. A combination as claimed in claim 21, wherein the plate or sign comprises one or more lines of weakness arranged to provide one or more plate frangible portions.

26. A combination as claimed in claim 21, wherein the plate comprises or has operably attached thereto an electronic module.

27. A combination according to claim 26, wherein the electronic module is located in or attached to a, the or one of the frangible portions.

28. A combination according to claim 26, wherein the electronic module has an on-board antenna.

29. A combination according to claim 26, wherein the electronic module comprises connection means for connection to an outboard antenna.

30. A combination according to claim 29, wherein said connection means is secured or securable to a, the or at least one of the frangible portion(s) of the plate or sign.

31. A combination according to claim 21, wherein the plate or sign has a substantially planar major surface and an electronic module located in or on the substrate, the substrate further comprising one or more lines of weakness to define one or more frangible areas in or on which the module is located.

32. A combination according to claim 31, further comprising connection means for connection to an outboard antenna.

33. A combination according to claim 31, further comprising an on-board antenna.

34. A combination according to claim 21, wherein the plate or sign comprises a substrate having a substantially planar major surface and an electronic module located in or on the substrate, connection means to connect the module to outboard antenna means and further comprising one or more lines of weakness to define at least one frangible portion, said connection means being secured across one or more of the lines of weakness.

35. A combination according to claim 34, wherein said connection means are connected physically to said antenna means.

36. A combination as claimed in claim 34, wherein said connection means are operably connected to said antenna means.

37. A combination as claimed in claim 34, wherein the substrate has a retro-reflective material secured thereto.

38. A combination according to claim 37, wherein the retroreflective material is sheet material, which has discontinuities in its structure.

\* \* \* \* \*